United States Patent
Kim et al.

(10) Patent No.: US 7,333,288 B2
(45) Date of Patent: Feb. 19, 2008

(54) METHOD AND APPARATUS FOR SINGLE WRITTEN-IN REPEATABLE RUN-OUT CORRECTION FUNCTION USED IN MULTI-STAGE ACTUATION CONTROL OF HARD DISK DRIVE

(75) Inventors: Young-Hoon Kim, Cupertino, CA (US); Sang Hoon Chu, San Jose, CA (US); Dong Jun Lee, Sunnyvale, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 99 days.

(21) Appl. No.: 11/482,535

(22) Filed: Jul. 6, 2006

(65) Prior Publication Data

US 2008/0007863 A1   Jan. 10, 2008

(51) Int. Cl.
*G11B 5/596* (2006.01)
(52) U.S. Cl. .................................. 360/77.04
(58) Field of Classification Search ............ 360/77.04, 360/78.05, 75, 78.09, 78.12
See application file for complete search history.

(56) References Cited

U.S. PATENT DOCUMENTS

| 5,138,594 | A | * | 8/1992 | Fennema et al. | 369/44.29 |
| 5,920,441 | A | * | 7/1999 | Cunningham et al. | 360/78.05 |
| 6,005,742 | A | * | 12/1999 | Cunningham et al. | 360/78.05 |
| 6,594,106 | B1 | * | 7/2003 | Serrano et al. | 360/78.09 |
| 7,145,745 | B1 | * | 12/2006 | Shepherd et al. | 360/77.04 |

* cited by examiner

*Primary Examiner*—Fred F. Tzeng
(74) *Attorney, Agent, or Firm*—GSS Law Group; Earle Jennings

(57) ABSTRACT

RRO corrector function is formulated to partition the contribution of micro-actuator control from the other voice coil assembly contributions. Single stage actuation is supported by zeroing the micro-actuator control queue, otherwise multi-stage actuation is supported. The multi-stage actuation may include dual stage actuation and in some embodiments triple stage actuation. Triple stage further partitions RRO corrector function for the contribution of the second micro-actuator. Method of initializing an assembled hard disk drive creates hard disk drive as product, using the written-in parameter list for track on the disk surface to recreate the RRO corrector as RRO corrector filter using queues updated by NRRO corrector.

22 Claims, 26 Drawing Sheets

Fig. 2A Prior Art
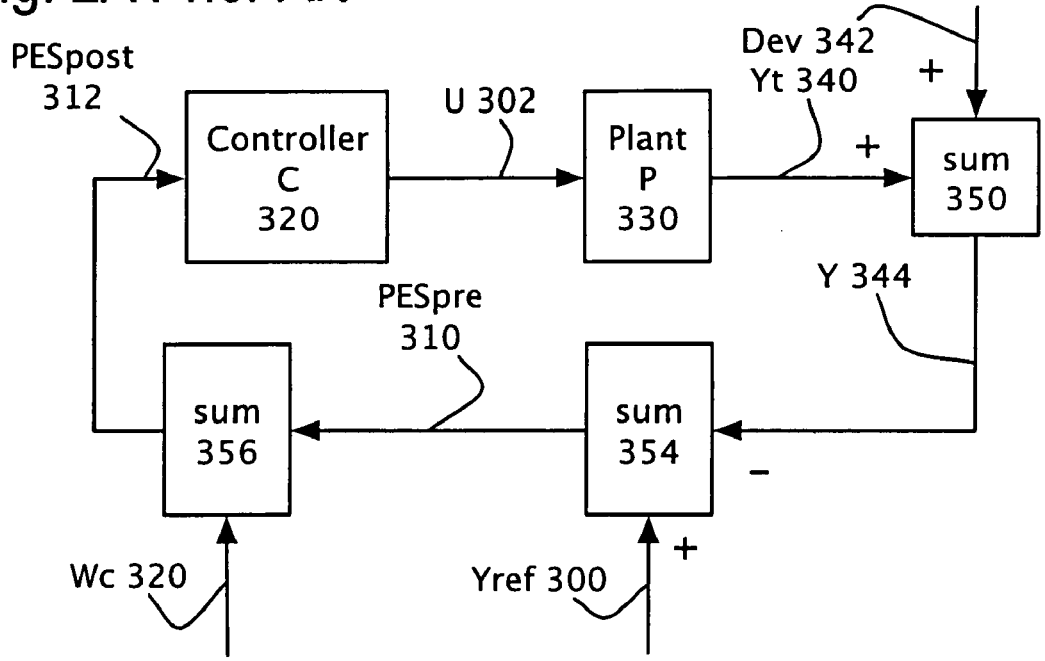
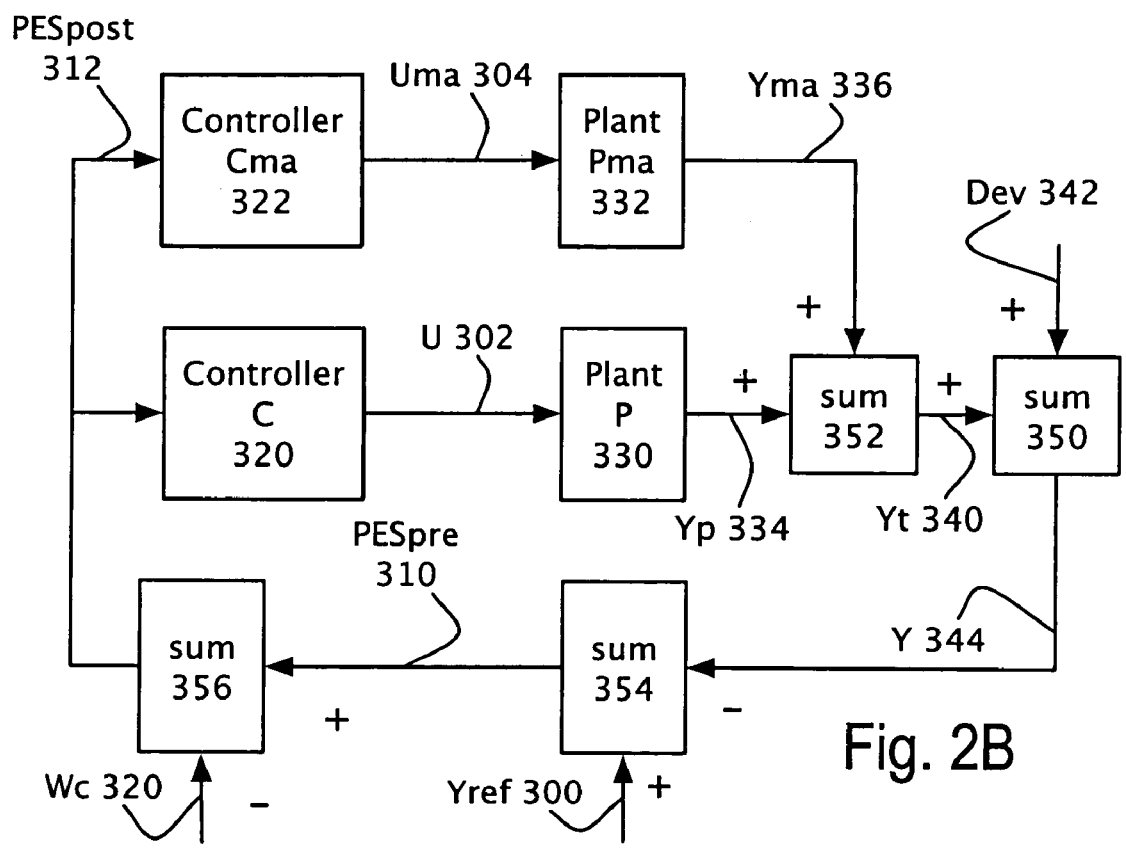
Fig. 2B

Written-in parameter List 320L

| Micro-actuator Control Contribution F | | Voice Coil Motor Control Contribution B | Voice Coil Motor Plant Contribution A |
|---|---|---|---|
| 2nd Micro-actuator Control Contribution L | | | |

Fig. 17A

Written-in parameter List 320L

| Micro-actuator Control Contribution F | Micro-actuator Plant Contribution G | Voice Coil Motor Control Contribution B | Voice Coil Motor Plant Contribution A |
|---|---|---|---|
| 2nd Micro-actuator Control Contribution L | 2nd Micro-actuator Plant Contribution M | | |

Fig. 17B

METHOD AND APPARATUS FOR SINGLE WRITTEN-IN REPEATABLE RUN-OUT CORRECTION FUNCTION USED IN MULTI-STAGE ACTUATION CONTROL OF HARD DISK DRIVE

TECHNICAL FIELD

This invention relates to hard disk drives, in particular, to apparatus and methods for controlling Repeatable Run-Out deviations in positioning a slider above a disk surface in a hard disk drive in a uniform manner supporting single stage and multi-stage actuation.

BACKGROUND OF THE INVENTION

Contemporary hard disk drives include an actuator assembly pivoting through an actuator pivot to position one or more read-write heads, embedded in sliders, each over a disk surface. The data stored on the disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access the data stored on the track.

Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon. To minimize Repeatable Run-Out errors, a correction function is written onto the disk surface and used to correct the repeatable errors. With the development of micro-actuators, servo controllers have had a need to support both single stage actuation using just the voice coil motor, and dual stage actuation also using the micro-actuator. However, there are several problems the inventors have encountered during their work with controlling the positioning of sliders above a disk surface in hard disk drives. Straightforward approaches to these correction functions leads to storing two corrector functions for each track, doubling the storage overhead for each track on the disk surface. One of the corrector functions works with the single stage actuator mode and the other works with the dual stage actuator mode of the servo controller. There is another, trickier problem, having to do with the possibility of injecting discontinuities caused by the differences between these corrector functions when the servo controller switches between single and dual stage actuation.

What is needed are corrector functions for Repeatable Run-Out which require nearly the same storage overhead as functions used in single stage actuator hard disk drives, which seamlessly support the servo controller in single stage and multi-stage actuator modes. What is needed are hard disk drives storing these functions for tracks on their disk surfaces incorporating these advantages.

SUMMARY OF THE INVENTION

The invention minimizes the Repeatable Run-Out (RRO) component of the deviation statistics of the Position Error Signal (PES) particularly when the hard disk drive is following a track on a disk surface, known hereafter as track following mode. There are two typical components of PES deviations. The first component is often referred to as the Repeatable Run-Out (RRO), which repeats itself every time a track is followed. Non-Repeatable Run-Out (NRRO), which does not repeat itself.

There are several situations in which the ability to switch between single stage and dual stage actuation is preferred. Single stage actuator is preferred occurs when a micro-actuator fails. It is preferred that the servo-controller be able to readily return to using single stage actuation once the micro-actuator's failure has been recognized. By way of another example, during the seeking of a track, the voice coil motor may be used by itself to move the slider across what may well be thousands of tracks on a disk surface. Once close, the hard disk drive enters track following mode, and use of both the voce coil motor and the micro-actuator to laterally position the slider to follow the track may be preferred.

The invention provides an efficient approach to correcting the RRO of the track as written onto the disk surface during the initialization of an assembled hard disk drive, which is one of the last stages in manufacturing a hard disk drive by partitioning the RRO corrector filter into calculating a voice coil assembly corrector value and a micro-actuator control corrector value. Only the micro-actuator control corrector value is affected by the actuation mode. When the hard disk drive is in single stage actuation mode, the micro-actuator is turned off, and within a short time, the micro-actuator control corrector value is zero. When in dual stage actuation, the micro-actuator is active and the micro-actuator corrector value tends to be non-zero.

A result of reducing the RRO of the track is that this minimizes the Track Mis-Registration of the track during normal access operations. The approach taken is to write in RRO statistics that readily work in both single stage and dual stage actuator modes, allowing the servo controller to switch between single and dual stage actuator mode seamlessly as needed.

The invention includes a method of initializing a disk surface included in a disk in an assembled hard disk drive using a multi-stage actuator mechanism to laterally position a read-write head near a track on the disk surface to create the written-in parameter list of the Repeatable Run-Out (RRO) correction function for use in all actuation modes of the track.

The parameters of the RRO corrector function, include at least one parameter for the voice coil motor control contribution, at least one parameter for the voice coil motor plant contribution, and at least one parameter for the micro-actuator control contribution.

This method may be preferably performed for each of the tracks used for data access on the disk surface. The second disk surface included in the disk may be used for data access, and the method may further include for each track used for data access on the second surface, performing the operations of the method for that track.

The hard disk drive include the disk surface containing the written-in RRO corrector parameter list is a product of this initialization process.

An embedded circuit included in the assembled hard disk drive may implement this method. The embedded circuit may include a servo computer accessibly coupled to a servo memory and directed by a burn-in program system, comprising program steps residing in the servo memory. The burn-in program system may include program steps for each step of the method.

The invention includes a method of using the written-in RRO corrector parameter list in the hard disk drive. The method includes the following. Acquiring the written-in RRO corrector parameter list for the track from the disk surface to recreate the voice coil motor control contribution, the voice coil motor plant contribution, and the micro-actuator control contribution, each for the track used for data access on the disk surface. Controlling actuation of the hard disk drive using the RRO corrector function for the track, based upon the voice coil motor control contribution, the voice coil motor plant contribution, and the micro-actuator control contribution.

The method of use may further include following the track in single stage actuation mode and/or dual stage actuation mode. Following the track in single stage actuation mode may occur when the micro-actuator is damaged.

The hard disk drive implementing the invention's method of using the written-in RRO corrector parameter list may preferably include the following. A servo controller driving a micro-actuator to laterally position a slider near the track on the disk surface to update the micro-actuator control queue, and the servo controller driving the voice coil motor to laterally position the slider close to the track on the disk surface to update the voice coil motor control queue and the voice coil motor plant queue.

The servo controller may further include a servo computer accessibly coupled to a servo memory and directed by a servo program system, including program steps residing in the servo memory. The servo program system may include Acquiring the written-in RRO corrector parameter list for the track from the disk surface to recreate the voice coil motor control contribution, the voice coil motor plant contribution, and the micro-actuator control contribution, each for the track used for data access on the disk surface. Controlling actuation of the hard disk drive using the RRO corrector function for the track, based upon the voice coil motor control contribution, the voice coil motor plant contribution, and the micro-actuator control contribution, as discussed above.

In the method of initializing, determining the micro-actuator control contribution may further include determining the micro-actuator control contribution and the micro-actuator plant contribution to the RRO corrector function of the track on the disk surface. The parameters of the RRO corrector function, further include at least one parameter for the micro-actuator plant contribution.

The hard disk drive may include a second micro-actuator further contributing to the lateral position of the read-write head to the track on the disk surface. The parameters of the RRO corrector function for the track on the disk surface, further include: at least one parameter for a second micro-actuator control contribution, with the methods of initializing and use being altered accordingly.

This hard disk drive operates in the single stage actuation mode when the micro-actuator control queue is updated with zero and the second micro-actuator control queue is updated with zero. The hard disk drive operates in the dual stage actuation mode when one of the micro-actuator control queue and the second micro-actuator control queue is updated with zero. And the hard disk drive operates in the triple stage actuation mode when both of the micro-actuator control queue and the second micro-actuator control queue are updated with non-zero.

As used herein the term micro-actuator refers to a micro-actuator assembly which couples to the slider to aid in positioning its read-write head near the track on the disk surface, or to a micro-actuator embedded in the slider altering the position of-its read-write head. An example of a micro-actuator embedded in the slider includes the vertical micro-actuator embedded in the slider to alter the vertical position of the read-write head. While this invention is primarily focused on the lateral positioning issues, but is readily applicable to vertical position as well.

BRIEF DESCRIPTION OF THE DRAWINGS

FIGS. 2A and 2B show approaches to modeling the RRO corrector function;

FIGS. 17A and 17B show some refinements of the written-in parameter list supporting the hard disk drive of FIGS. 15, 18A, 18B, and 19;

DETAILED DESCRIPTION

Figure 1:
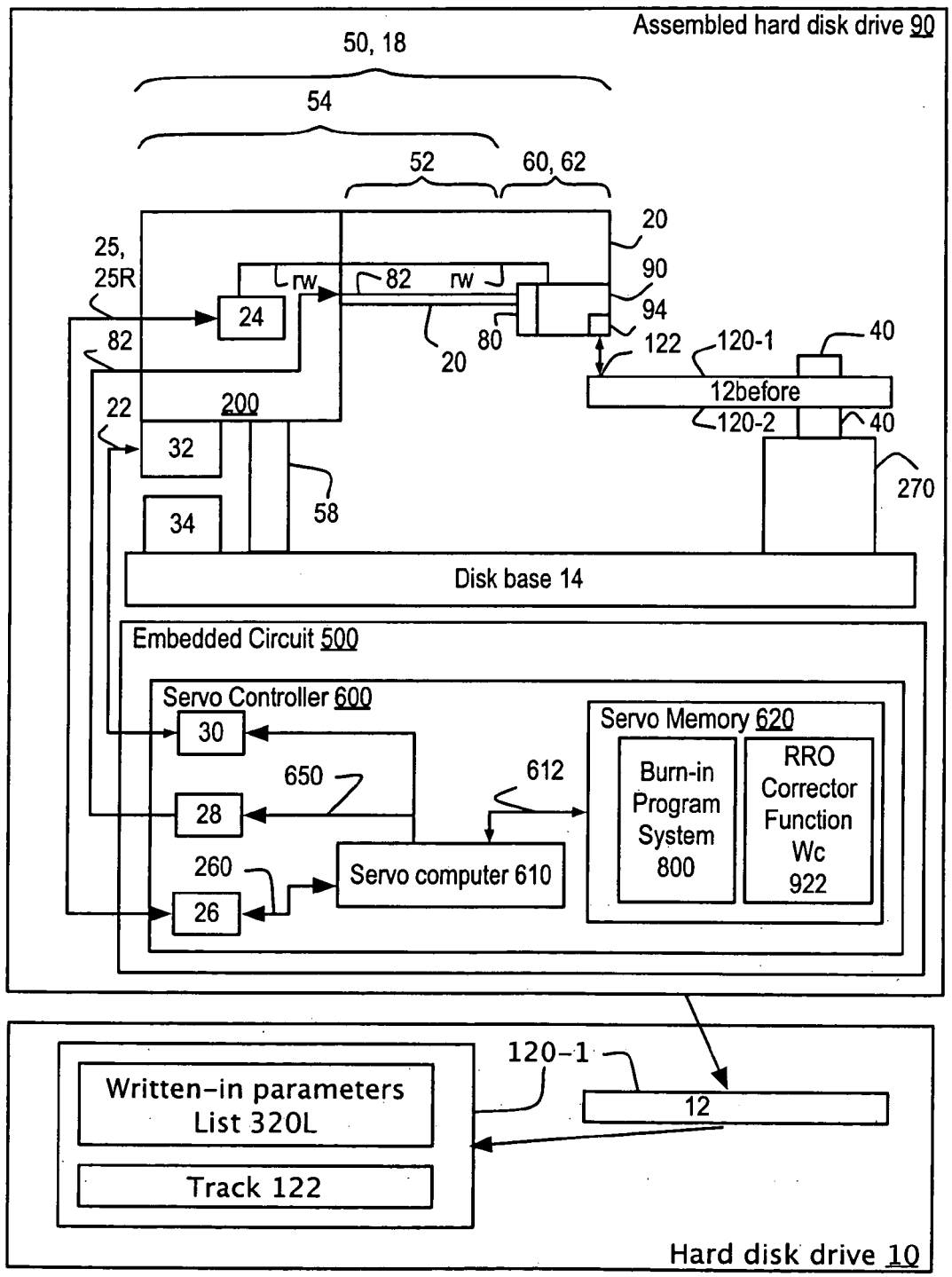
FIG. 1 shows an assembled hard disk drive including the burn-in program system and the hard disk drive as the product of the initialing method implemented by the burn-in system.

This invention relates to hard disk drives, in particular, to apparatus and methods for controlling Repeatable Run-Out deviations in positioning a slider above a disk surface in a hard disk drive in a uniform manner supporting single stage and multi-stage actuation.

The invention minimizes the Repeatable Run-Out (RRO) component of the deviation statistics of the Position Error Signal (PES) particularly when the hard disk drive is following a track on the disk surface, known hereafter as track following mode. There are two typical components of PES deviations. The first component is often referred to as the Repeatable Run-Out (RRO), which repeats itself every time a track is followed. Non-Repeatable Run-Out (NRRO), which does not repeat itself every time the track is followed.

There are several situations in which the ability to switch between single stage and dual stage actuation is preferred. Single stage actuator is preferred occurs when a micro-actuator fails. It is preferred that the servo-controller be able to readily return to using single stage actuation once the micro-actuator's failure has been recognized. By way of another example, during the seeking of a track, the voice coil motor may be used by itself to move the slider across what may well be thousands of tracks on a disk surface. Once close, the hard disk drive enters track following mode, and use of both the voce coil motor and the micro-actuator to laterally position the slider to follow the track may be preferred.

The invention provides an efficient approach to correcting the RRO of the track as written onto the disk surface during the initialization of an assembled hard disk drive, which is one of the last stages in manufacturing a hard disk drive. A result of reducing the RRO of the track is that this minimizes the Track Mis-Registration of the track during normal access operations. The approach taken is to write in RRO statistics that readily work in both single stage and dual stage actuator modes, allowing the servo controller to switch between single and dual stage actuator mode seamlessly as needed.

The invention includes a method of initializing a disk surface 120-1 included in a disk 12 in an assembled hard disk drive 9 using a multi-stage actuator mechanism to laterally position a read-write head 90 near a track 122 on the disk surface to create the written-in parameter list of the Repeatable Run-Out (RRO) correction function for use in all actuation modes of the track as shown in FIGS. 1 to 4, 6 and 8A. The multi-stage actuator mechanism includes a voice coil motor 18 and a micro-actuator 80, both aiding in controlling the lateral position LP of the read-write head near the track. The invention formats a raw disk 12before, to create the initialized disk surface 120-1 on the disk 12 in the hard disk drive 10, which is the product of this process.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element. By way of example, a computer may include a general purpose computer and/or a Digital Signal Processor (DSP). The general purpose computer and/or DSP may directly implement fixed point and/or floating point arithmetic.

Figure 5A:
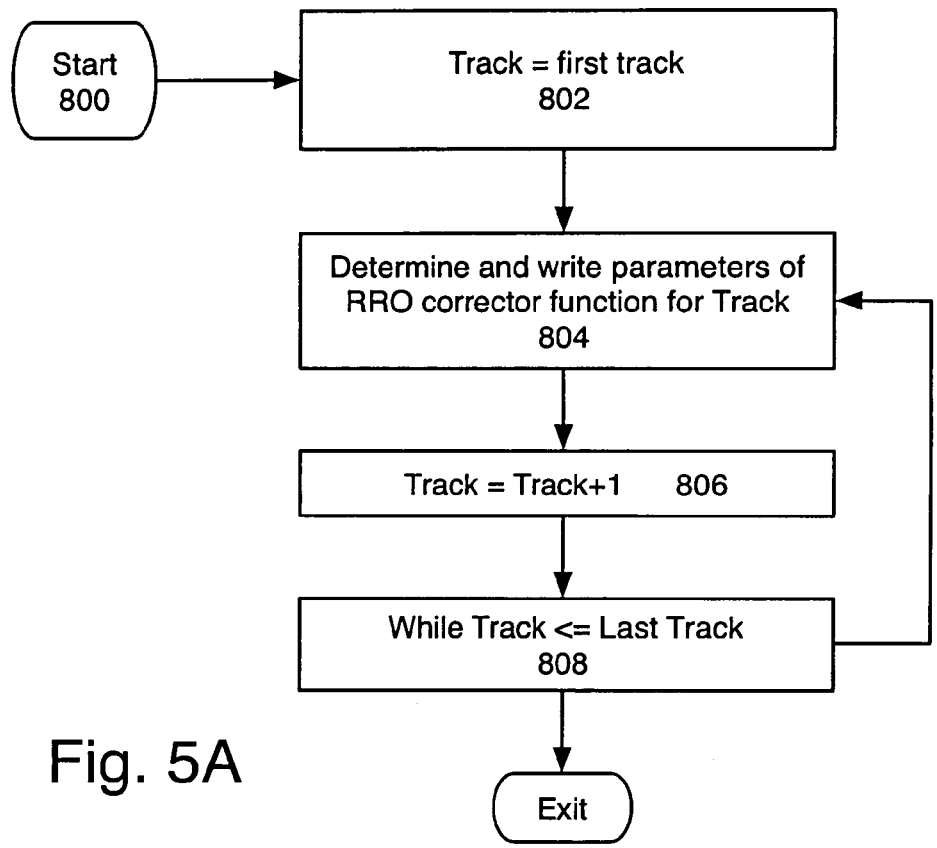
FIGS. 5A to 5C show some details of the burn-in program system implementing aspects of the invention's method of initializing the raw disk in the assembled hard disk drive to create the disk surface in the hard disk drive.
Figure 5B:
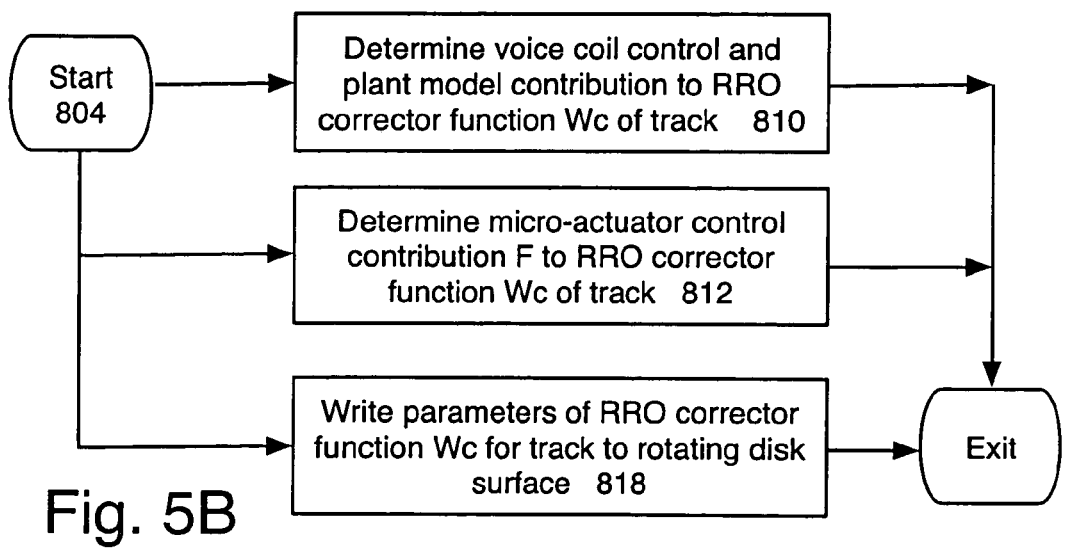

An embedded circuit 500 included in the assembled hard disk drive 9 may implement this method. The assembled disk drive may further include a servo controller 600 implementing this process and included in the embedded circuit. The embedded circuit, and preferably the servo controller, may preferably include a servo computer 610 accessibly coupled 612 to a servo memory 620 and directed by a burn-in program system 800, comprising program steps residing in the servo memory. The burn-in program system may include program steps for each step of the method. The method includes the following operations, which are shown in FIG. 5B for the track as implemented by operation 804 of the burn-in program system in FIG. 5A. Operation 810 supports determining a voice coil motor control contribution B and a voice coil motor plant contribution B to a Repeatable Run-Out (RRO) corrector function Wc 320 for the track on the disk surface 120-1. Operation 812 supports determine a micro-actuator control contribution F to the RRO corrector function for the track. Operation 814 supports writing the parameters of the RRO corrector function for the track to the disk surface to create a written-in parameter list 320L for the RRO corrector function Wc 3220 on the disk surface included in a hard disk drive 10.

The invention operates by generating a Repeatable Run-Out (RRO) Corrector Function Wc 922 for a track 122 on the disk surface 120-1, and recording the parameters of this function as the written-in parameter list 320L for the track on the disk surface 120-1, which when completed for the tracks used for data on the disk surface, yields at least one side of the prepared disk 12 in the hard disk drive 10. By way of example, FIG. 5A shows the following operations as details of the burn-in program system 800, and the invention's method of initializing the raw disk 12 before. Operation 802 supports setting the track to a first track used for data access. Operation 804 supports determining and writing the parameters of an RRO corrector function for the track seamlessly supporting both single stage and multi-stage actuation. Operation 806 supports incrementing the track. Operation 808 supports testing whether the track is less than or equal to the last track used for data access. If the track is less than or equal to the last track, the servo computer 610 is directed by the burn-in program system to proceed to operation 804, otherwise it proceeds to exit.

Figure 6:
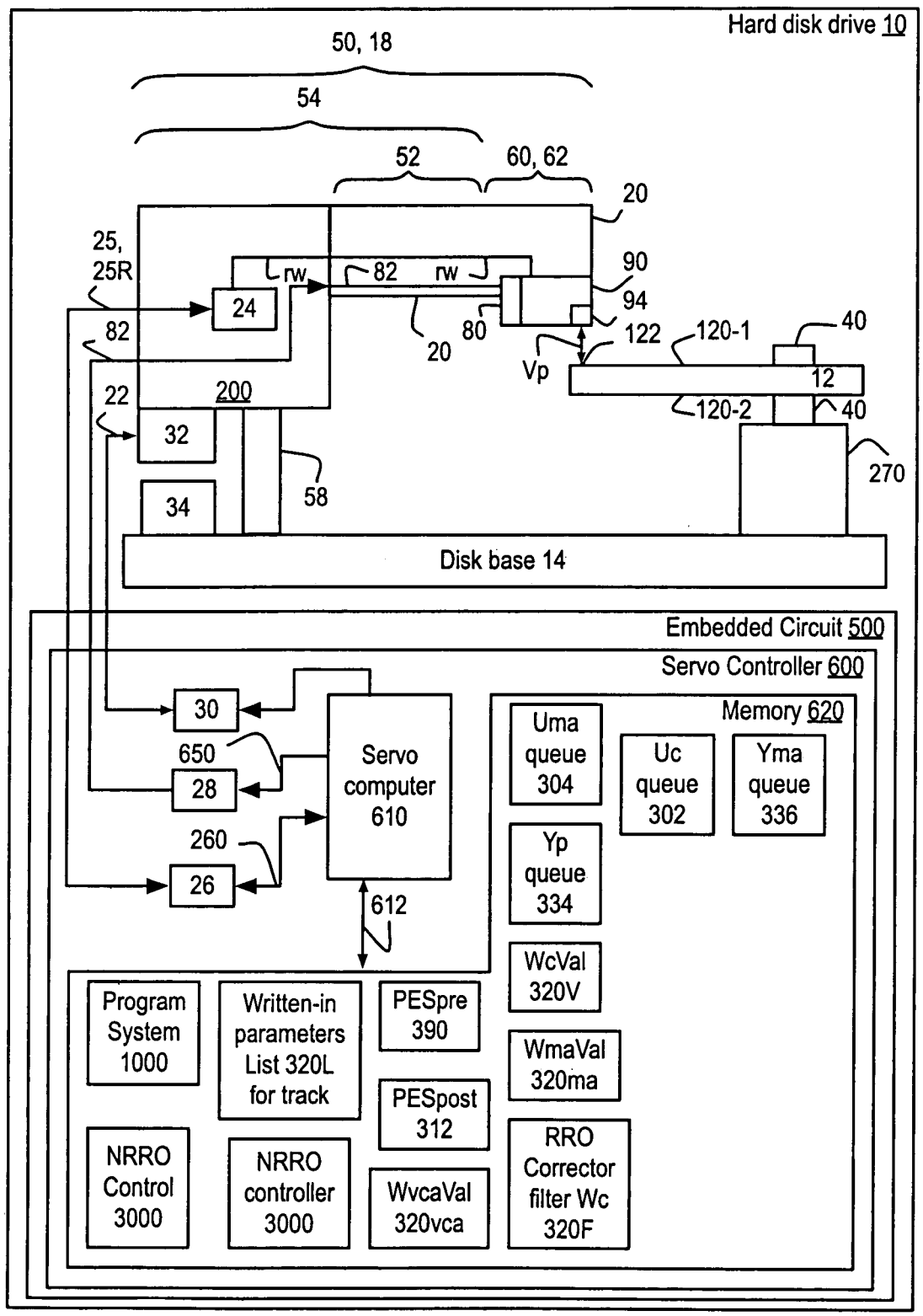
Figure 8A:
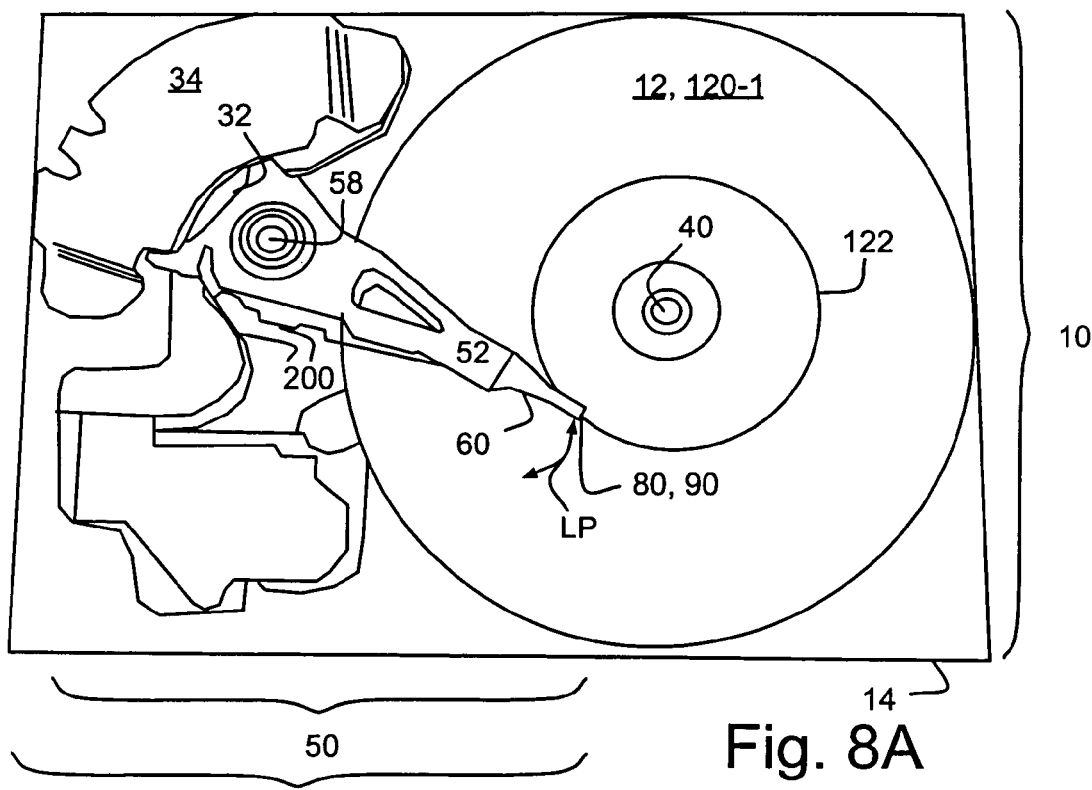
FIG. 8A shows a partially assembled hard disk drive of FIG. 1.
Figure 8B:
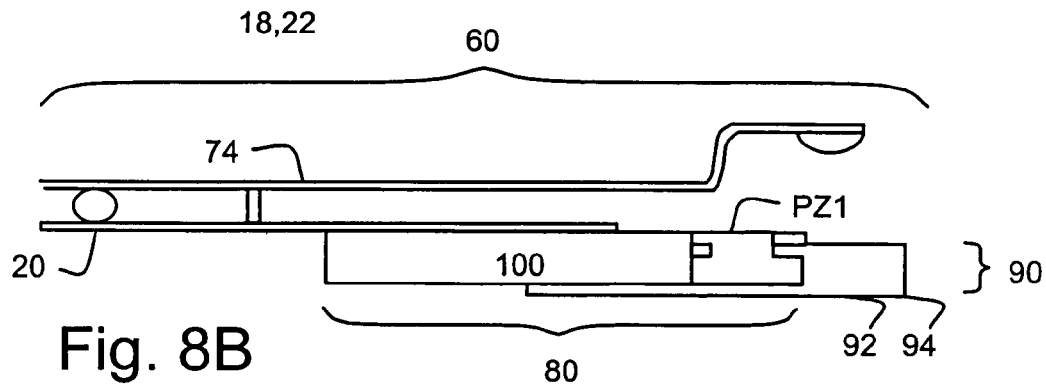
FIGS. 8B to 9B show the head gimbal assembly of FIGS. 1, 3, 4, and 6 including the slider of coupled with a micro-actuator assembly using the piezoelectric effect.

By way of example, consider the hard disk drive 10 supporting single stage actuation using just the voice coil motor 18 to laterally position LP a slider 90, as well as dual stage actuation further using the micro-actuator assembly 80 mechanically coupled to the slider as shown in FIGS. 6 and 8A. The written-in parameter list 320L provides for recreating the RRO corrector function Wc 320 used by the servo controller 600 support both single stage actuation as well as dual stage actuation, minimizing the Repeatable Run-Out (RRO) component of the deviation statistics of the Position Error Signal (PES) when following the track 122 on the disk surface 120-1, particularly in track following mode. The written-in parameter list includes the control parameters stored on part of the disk surface reserved for internal use and typically loaded into the servo controller 600 when the hard disk drive 10 powers up or is reset.

Before going on to further discuss the details of the invention, a brief discussion of prior art RRO corrector functions in general, and the specific elements of the invention's RRO corrector function will now be described. Typically, there are two prior art approaches employed to calculate the written-in RRO corrector Wc 320 as shown in FIGS. 2A and 2B.

The first typical approach uses the PESpre 310 and servo Error Sensitivity Function (ESF) to calculate the written-in RRO as shown in FIG. 2A. This approach requires two sets of Error Sensitivity Functions, one for single stage and the other for dual stage actuation, doubling the memory overhead on the disk surface. The total deviation Dev 342 is defined by $$Dev = d_{rro} + d_{nrro} \qquad (0.1)$$

The written in RRO corrector function Wc 320 is defined by $$w_c = \hat{d}_{rro} = S^{-1} \cdot PES_{post} \qquad (0.2)$$

where $$S \equiv \frac{1}{1 + PC} \qquad (0.3)$$

is the error sensitivity function associated with the servo loop including the dynamic controller C 320 providing the control variable U 302 to the Plant P 330 to create the position in time Yt 340. There is an additional problem with this approach, the Signal to Noise Ratio (SNR) of the dual stage error sensitivity function will always be smaller than the single stage error sensitivity function, since the dual stage error sensitivity function would have the form $$S_{dual} \equiv \frac{1}{1 + PC + P_{ma}C_{ma}} \qquad (0.4)$$

where $P_{ma}$ relates to the micro-actuator Plant Pma 330 and $C_{ma}$ relates to the micro-actuator controller Cma 322, as shown in FIG. 2B.

The second approach uses PES and the control effort of the voice coil motor 18 to calculate the written-in RRO. This typical approach suffers from having only one control effort input, making it unacceptable for dual stage actuation, since the micro-actuator assembly 80 is also contributing to the lateral position LP. Here the written-in RRO corrector function Wc 320 is defined by $$w_c = \hat{d}_{rro} = (1 + PC) \cdot PES_{post} = PES_{post} + P \cdot u \qquad (0.5)$$

This second typical approach also suffers from requiring twice the storage overhead as the first approach, because two separate written-in RRO corrector functions must be stored, one for single stage actuation and the other dual stage actuation.

The invention uses a modification of the second typical approach based upon FIG. 2B, where the written-in RRO corrector function Wc 320 defined by $$w_c = \hat{d}_{rro} = (1 + P_C C + P_{MA} C_{MA}) \cdot PES_{post} \qquad (0.6)$$
$$= PES_{post} + P_C \cdot u_C + P_{MA} \cdot u_{MA}$$

The inventors have found that this expression of the written-in RRO corrector function Wc 320 has several advantages. It requires only slightly more memory than the second approach for single stage actuation, and the conversion between single and dual stage actuation is controlled by $u_{MA}$. In single stage actuation, $u_{MA}[k]=0$ and in dual stage actuation, $u_{MA}[k] \neq 0$.

By way of example, an adequate model of the micro-actuator plant may have constant gain, making $P_{MA}$ a constant, and affording a model of the micro-actuator plant output Yma 336 by $$y_{MA}[k] = F_0 u_{MA}[k] \qquad (0.7)$$

It may further be preferred to model the voice coil motor 18 Plant Pc 330 by the transfer function $$P_C(z) = \frac{B(z)}{A(z)} = \frac{b_0 + b_1 z^{-1}}{1 + a_1 z^{-1} + a_2 z^{-2}} \qquad (0.8)$$

leading to predicting the voice coil motor plant output Yp 334 by $$y_P[k] = b_0 u_C[k] + b_1 u_C[k-1] - a_1 y_P[k-1] - a_2[k-2] \qquad (0.9)$$

Thus requiring the storage of the parameters of Wc 320 as $$W_C \equiv \{F_0, a_1, a_2, b_0, b_1\} \qquad (0.10)$$

In general, embodiments of the invention will use a micro-actuator transfer function Pma $$P_{MA} = \frac{F(z)}{G(z)} = \frac{\sum_{k=0}^{N_F} F_k z^{-k}}{1 + \sum_{l=1}^{N_G} G_k z^{-1}} \qquad (0.11)$$

Which expresses the micro-actuator plant output Yma 336 by $$y_{MA}[k] = \sum_{l=0}^{N_F} F_l u_{MA}[k-l] - \sum_{l=1}^{N_G} G_l y_{MA}[k-l] \qquad (0.12)$$

And in general the voice coil motor plant Pc 330 is often modeled by the transfer function $$P_C(z) = \frac{B(z)}{A(z)} = \frac{\sum_{k=0}^{N_B} b_0 z^{-k}}{1 + \sum_{l=1}^{N_A} a_l z^{-1}} \qquad (0.13)$$

Which models the voice coil motor 18 Plant Pc 330 by its output Yp 334 as $$y_C[k] = \sum_{l=0}^{N_B} b_l u_c[k-l] - \sum_{l=1}^{N_A} a_l y_C[k-l] \qquad (0.14)$$

and requires storage of the written-in parameter list 320L of RRO corrector function Wc 320 to include $$W_C = \{F_{k=0}, \ldots, N_F, G_{k=1}, \ldots, N_G, a_{k=1}, \ldots, N_A, b_{k=0}, \ldots, N_B\} \qquad (0.15)$$

Figure 3:
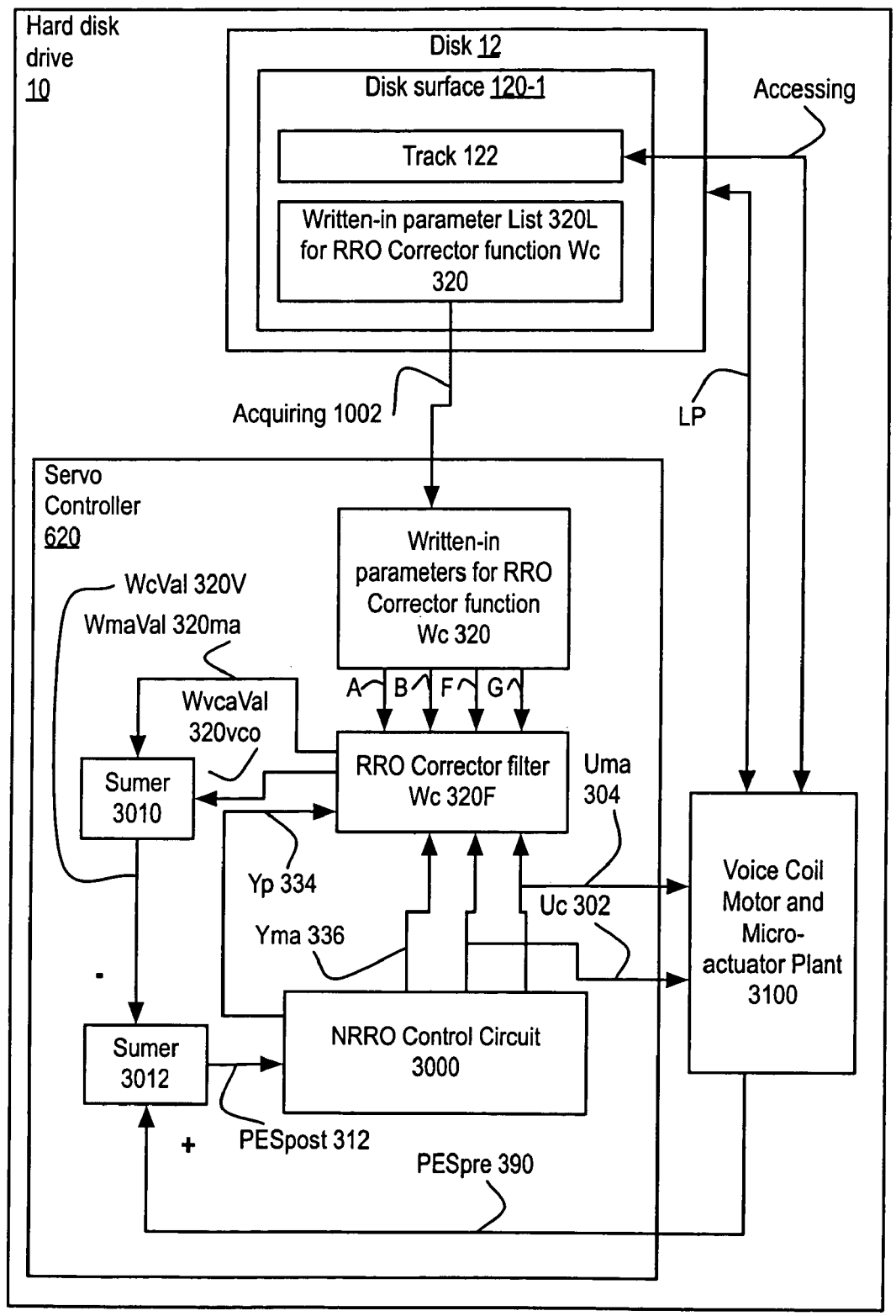
FIGS. 3, 4, 6, and 7A to 7F shows the invention's hard disk drive using the written-in parameter list of the invention's RRO corrector function.

The RRO corrector function Wc 320 may be implemented as the RRO Corrector filter 320F generating the RRO micro-actuator control corrector value WmaVal 320 ma which is added to the RRO voice coil assembly corrector value WvcaVal 320 vca to create the RRO corrector value WcVal 320V of FIG. 3. This is mathematically written as $$w_C\text{val}[k] \equiv w_{VCA}\text{val}[k] + w_{MA}\text{val}[k] \qquad (0.16)$$

The RRO micro-actuator control corrector value WmaVal 320 ma may be preferably defined by $$w_{MA}\text{val}[k] \equiv \sum_{l=0}^{N_F} F_l u_{MA}[k-l] \qquad (0.17)$$

which includes the micro-actuator control contribution $F \equiv [F_0 \ldots F_{N_F}]$ applied to a micro-actuator control queue Uma 304 denoted by $U_{MA} = [u_{MA}[0] \ldots u_{MA}[N_F]]$ to create the RRO micro-actuator control corrector value WmaVal 320 ma.

The RRO voice coil assembly corrector value WvcaVal 320 vca may be defined by $$w_{VCA}\text{val}[k] \equiv w_{VcmC}\text{val}[k] + w_{VcmP}\text{val}[k] + w_{MaP}\text{val}[k] \qquad (0.18)$$

showing the RRO voice coil assembly corrector value WvcaVal 320 vca denoted by $w_{VCA}\text{val}[k]$ as the RRO voice coil motor control value denoted by $w_{VcmC}\text{val}[k]$ added to the RRO voice coil motor plant value denoted by $w_{VcmP}\text{val}[k]$ and added to the RRO micro-actuator plant corrector value denoted by $w_{MaP}\text{val}[k]$.

The RRO voice coil motor control value denoted by $w_{VcmC}\text{val}[k]$ is defined as the voice coil motor control contribution $B \equiv [b_0 \ldots b_{N_B}]$ acting on the voice coil motor control queue Uc 302 denoted by $U_C \equiv [u_C[k] \ldots u_C[k-N_B]]$ $$w_{VcmC}\text{val}[k] \equiv \sum_{l=0}^{N_B} b_l u_C[k-l] \qquad (0.19)$$

The RRO voice coil motor control value denoted by $w_{VcmC}\text{val}[k]$ is defined as voice coil motor plant contribution denoted by $A \equiv [a_1 \ldots a_{N_A}]$ acting on the voice coil plant queue Yp 334 denoted by $Y_C \equiv [y_C[k-1] \ldots y_C[k-N_A]]$ $$w_{VcmP}\text{val}[k] \equiv -\sum_{l=1}^{N_A} a_l y_C[k-l] \qquad (0.20)$$

The RRO micro-actuator plant corrector value denoted by $w_{MaP}\text{val}[k]$ is defined as the micro-actuator plant contribution $G \equiv [G_1 \ldots G_{N_G}]$ acting on the micro-actuator plant queue Yma 336 denoted by $Y_{MA} \equiv [y_{MA}[k-1] \ldots y_{MA}[k-N_G]]$ $$w_{MaP}\text{val}[k] \equiv -\sum_{l=1}^{N_G} G_l y_{MA}[k-l] \qquad (0.21)$$

This single written-in Repeatable Run-Out corrector function Wc 320 has a general advantage of supporting both single stage and dual stage actuation with the same model, with the transition from dual stage to single stage actuation being handles by setting successive values of $u_{MA}[k]$ to zero. So that at the first time step $$U_{MA} = [0 u_{MA}[k-1] \ldots u_{MA}[k-N_F]] \qquad (0.22)$$

then on the second time step, $$U_{MA} = [0 \ 0 \ldots u_{MA}[k-N_F]] \qquad (0.23)$$

and so on, showing the dampening effect, if the higher order terms are significant, of the transition to single stage actuation on the Repeatable Run-Out from the micro-actuator assembly 80. When the higher order terms are treated as zero, as in (0.7), then the transition is modeled as instantaneous, with no residual effects.

Figure 4:
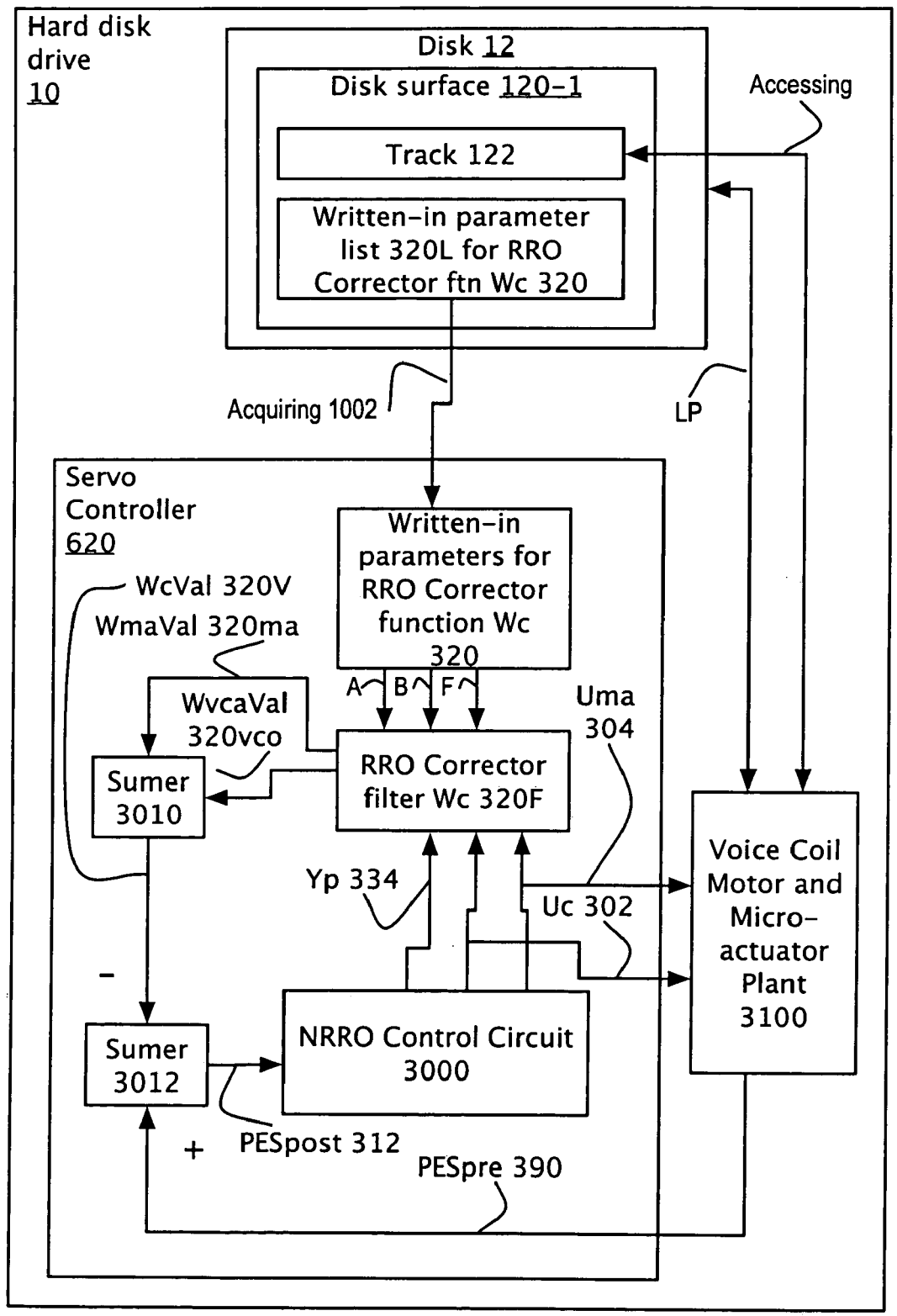

FIG. 4 shows a preferred embodiment of the invention, when $N_G = 0$, $G(z) = 1$ and $$P_{MA} = \sum_{k=0}^{N_F} F_k z^{-k} \qquad (0.24)$$

With the micro-actuator plant output Yma 336 expressed by $$y_{MA}[k] = \sum_{l=0}^{N_F} F_l u_{MA}[k-1] \qquad (0.25)$$

And requires storage of the written-in parameter list 320L of RRO corrector function Wc 320 as shown in FIG. 4 to include $$W_C = \{F_{k=0}, \ldots, N_F, a_{k-1}, \ldots, N_A, b_{k=0}, \ldots, N_B\} \qquad (0.26)$$

The RRO corrector function Wc 320 may be implemented as the RRO Corrector filter 320F generating the RRO micro-actuator control corrector value WmaVal 320 ma which is added to the RRO voice coil assembly corrector value WvcaVal 320 vca to create the RRO corrector value WcVal 320V of FIG. 3. This is mathematically written as $$w_C\text{val}[k] \equiv w_{VCA}\text{val}[k] + w_{MA}\text{val}[k] \qquad (0.27)$$

The RRO voice coil motor control corrector value WmaVal 320 ma may be preferably defined by as before by (0.17), again including the micro-actuator control contribution $F \equiv [F_0 \ldots F_{N_F}]$ applied to a micro-actuator control queue Uma 304 denoted by $U_{MA} \equiv [u_{MA}[0] \ldots u_{MA}[N_F]]$ to create the RRO micro-actuator control corrector value.

In these embodiments, contribution of the micro-actuator plant is negligible making the RRO voice coil assembly corrector value WvcaVal 320 vca preferably defined by $$w_{VCA}\text{val}[k] \equiv w_{VcmP}\text{val}[k] + w_{VcmP}\text{val}[k] \qquad (0.28)$$

showing the RRO voice coil assembly corrector value WvcaVal 320 vca denoted by $w_{VCA}\text{val}[k]$ as the RRO voice coil motor control value denoted by $w_{VcmC}$val[k] added to the RRO voice coil motor plant value denoted by $w_{VcmP}$val[k].

The parameters of the RRO corrector function, include at least one parameter for the voice coil motor control contribution B, at least one parameter for the voice coil motor plant contribution A, and at least one parameter for the micro-actuator control contribution F as shown in FIG. 4.

This method may be preferably performed for each of the tracks used for data access on the disk surface. The second disk surface included in the disk may be used for data access, and the method may further include for each track used for data access on the second surface, performing the operations of the method for that track.

The invention includes a method of using the written-in RRO corrector parameter list 320L in the hard disk drive 10. The hard disk drive implementing the invention's method of using the written-in RRO corrector parameter list may preferably include the following shown in FIGS. 3 and 4. A servo controller 600 driving a micro-actuator 80 to laterally position LP a slider 90 near the track 122 on the disk surface 120-1 to update the micro-actuator control queue Uma 304, and the servo controller driving the voice coil motor 18 to laterally position the slider close to the track on the disk surface to update the voice coil motor control queue Uc 302 and the voice coil motor plant queue Yp 334.

Figure 7A:
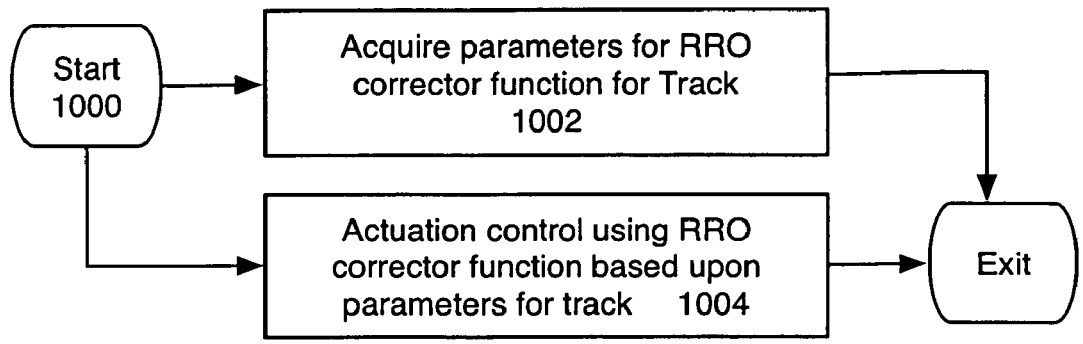

The servo controller 600 may further include a servo computer 610 accessibly coupled 612 to a servo memory 620 and directed by a servo program system 1000, including program steps residing in the servo memory. The servo program system implement the method of using the written-in RRO corrector parameter list 320 by operations as shown in FIG. 7A. Operation 1002 supports acquiring the written-in RRO corrector parameter list 320L for the track 122 from the disk surface 120-1 to recreate the voice coil motor control contribution B, the voice coil motor plant contribution A, and the micro-actuator control contribution F, each for a track used for data access on the disk surface. Operation 1004 supports controlling actuation of the hard disk drive 10 using the RRO corrector function Wc 320 for the track, based upon the voice coil motor control contribution B, the voice coil motor plant contribution A, and the micro-actuator control contribution F.

Figure 7B:
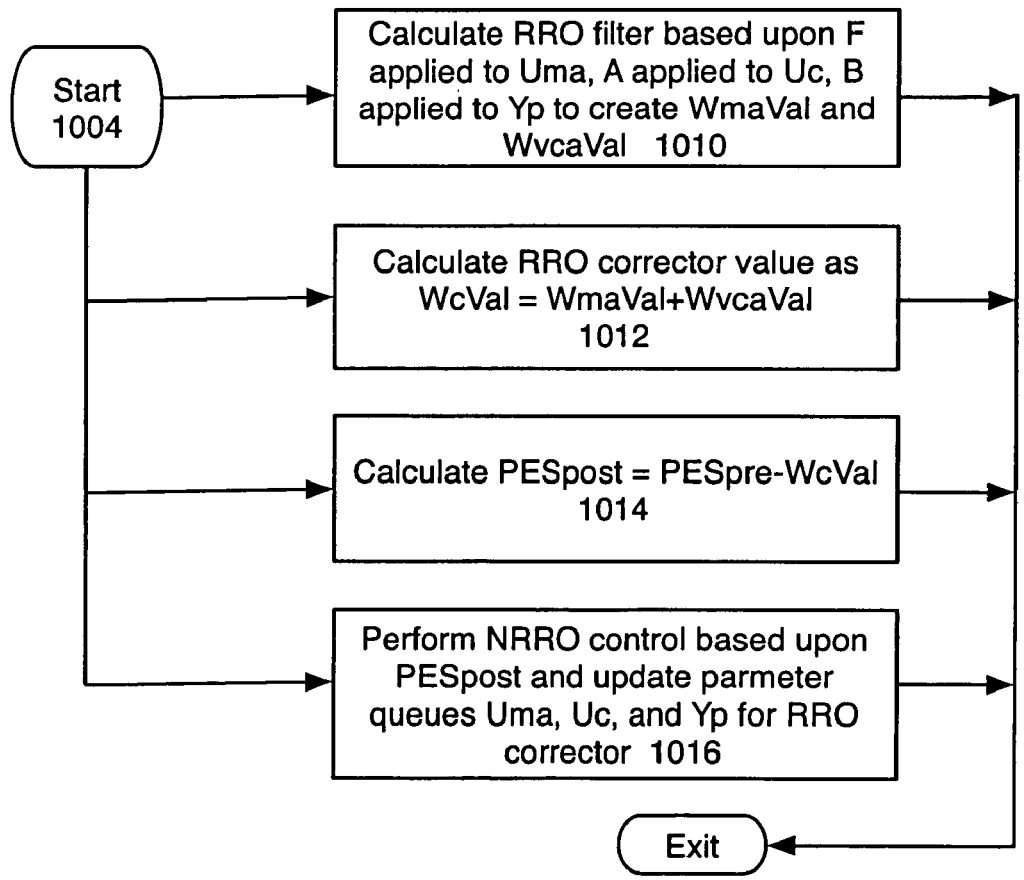

Operation 1004 controlling actuation preferably includes the following shown in FIG. 7B. Operation 1010 supports calculating the RRO corrector filter based upon the micro-actuator control contribution F applied to a micro-actuator control queue Uma 304, said voice coil motor control contribution B applied to a voice coil motor control queue Uc 302, said voice coil motor plant contribution A applied to a voice coil motor plant queue Yp 334, to create the RRO micro-actuator control corrector value WmaVal 320 ma and the RRO voice coil assembly corrector value WvcaVal 320 vca. Operation 1012 supports calculating the RRO corrector value WcVal 320 as the RRO micro-actuator control corrector value added to the RRO voice coil assembly corrector value. Operation 1014 supports calculating the Position Error Signal (PES) post-RRO as the PES pre-RRO minus the RRO corrector value. And operation 1016 supports performing Non-Repeatable Run-Out (NRRO) control based upon the PES post RRO and updating the micro-actuator control queue, the voice coil motor control queue, and the voice coil motor plant queue.

The hard disk drive 10 operates in a single stage actuation mode when the micro-actuator control queue Uma is updated with a zero as discussed with regards to equations (0.22) and (0.23). Otherwise the hard disk drive operates in a dual stage actuation mode.

Figure 7C:
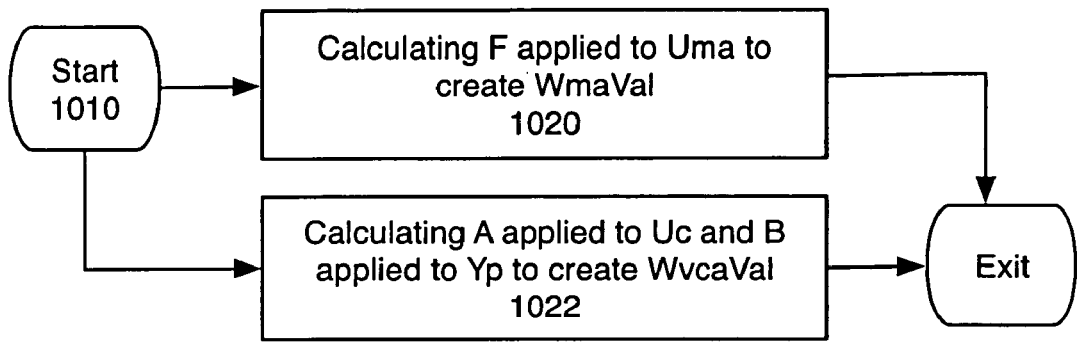

Operation 1010 calculating the RRO corrector filter Wc 320F of FIG. 7B may further include the operations of FIG. 7C. Operation 1020 supports calculating the micro-actuator control contribution F applied to the micro-actuator control queue Uma 304 to create the RRO micro-actuator control corrector value WmaVal 320 ma denoted by $w_{MA}$val[k] and discussed regarding equation (0.17). Operation 1022 calculating the voice coil motor control contribution A applied to the voice coil motor control queue Uc 302 and the voice coil motor plant contribution B applied to the voice coil motor plant queue Yp 334 the RRO voice coil assembly corrector value WvcaVal 320 vca may further include the operations of FIG. 7D.

Operation 1030 supports calculating the voice coil motor control contribution B applied to a voice coil motor control queue Uc 302 to create the RRO voice coil motor control corrector value denoted by $w_{VcmC}$val[k] and discussed regarding equation (0.19). Operation 1032 supports calculating the voice coil motor plant contribution A applied to a voice coil motor plant queue Yp 334 to create the RRO voice coil motor plant corrector value denoted by $w_{VcmP}$val[k] and discussed regarding equation (0.20). And operation 1034 calculating the RRO voice coil assembly corrector value WvcaVal 320 vca as the RRO voice coil motor control corrector value added to the RRO voice coil motor plant corrector value.

The method of use as shown in the servo program system 1000 may further include following the track 122 in single stage actuation mode and/or dual stage actuation mode. Following the track in single stage actuation mode may preferably occur when the micro-actuator 80 is damaged.

Figure 5C:
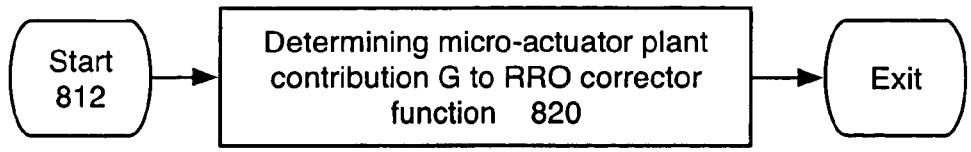
Figure 5D:
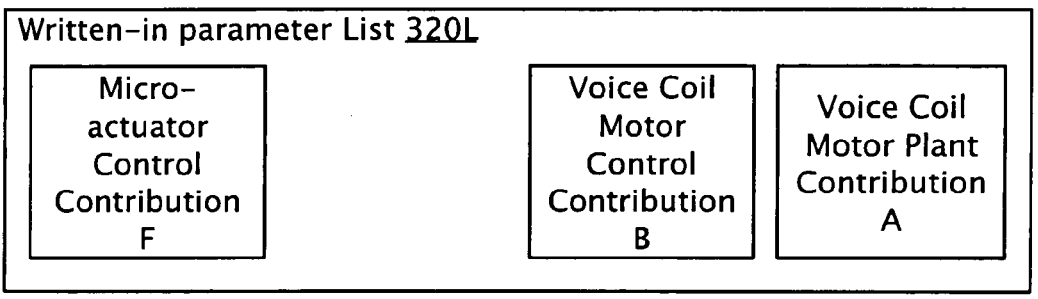
FIGS. 5D and 5E show examples of the written-in parameter list of the invention's RRO corrector function of FIG. 1.

The written-in parameter list 320L may preferably include the micro-actuator control contribution F, the voice coil motor control contribution B, and the voice coil motor plant contribution A, as shown in FIG. 5D.

Figure 5E:
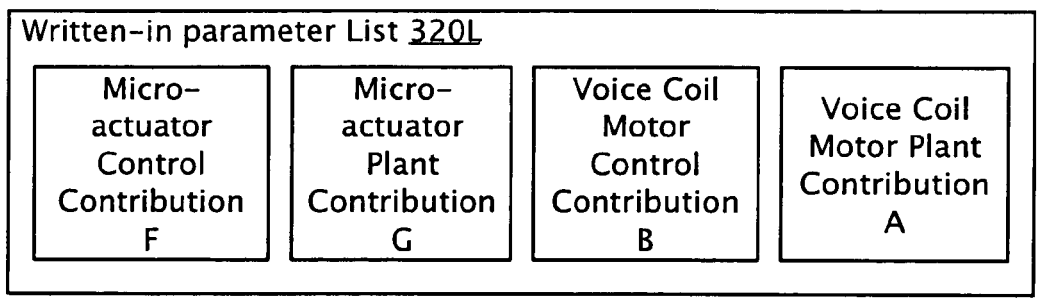

The method of initializing as shown in the burn-in program system 800, shows operation 812 determining the micro-actuator control contribution in FIG. 5B, and may further include operation 820, which further supports determining the micro-actuator plant contribution G to the RRO corrector function Wc of the track 122 on the disk surface 120-1 in FIG. 5C. The parameters of the RRO corrector function, in particular the written-in parameter list 320L may further include at least one parameter for the micro-actuator plant contribution G as shown in FIG. 5E.

Figure 7D:
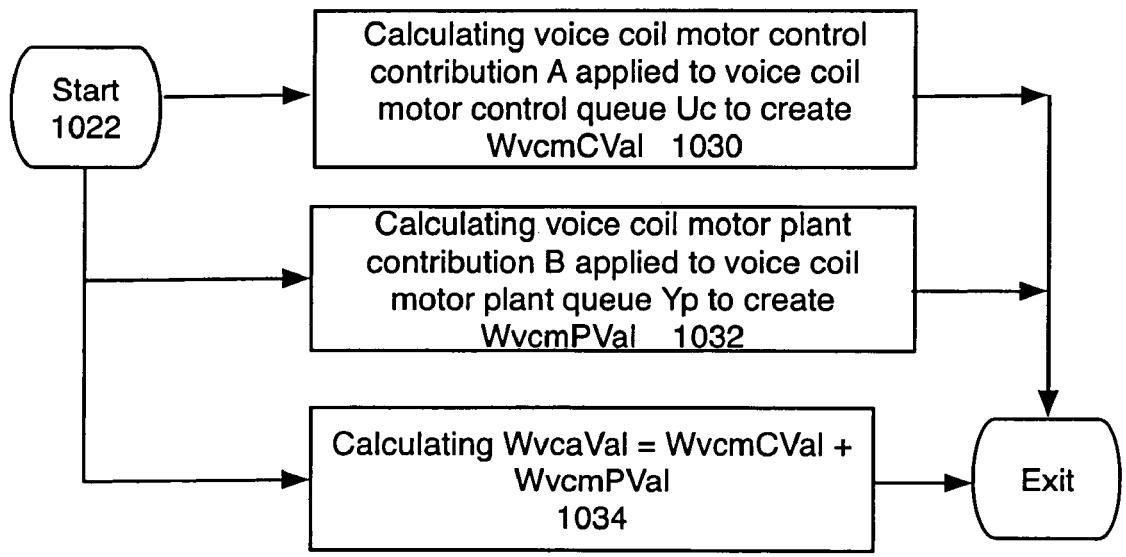
Figure 7E:
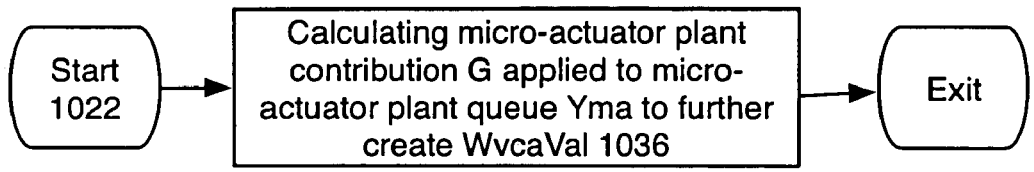

The method of using the written-in RRO corrector parameter list 320L discussed herein in terms of the servo program system 1000, in particular operation 1022 of FIGS. 7B and 7D, may further include operation 1036 calculating the micro-actuator plant contribution G applied to a micro-actuator plant queue Yma 336 to further create the RRO voice coil assembly corrector value WvcaVal 320 vca as shown in FIG. 7E.

Figure 7F:
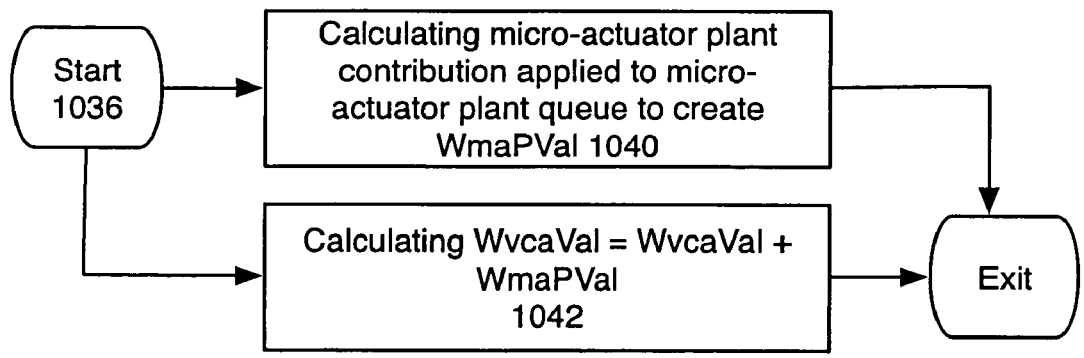

Operation 1036 creating the RRO voice coil assembly corrector value WvcaVal 320 vca may further include the operations of FIG. 7F. Operation 1040 supports calculating the micro-actuator plant contribution G applied to a micro-actuator plant queue Yma 336 to create the RRO micro-actuator plant corrector value WmaPVal denoted by $w_{MaP}$val[k] and discussed with regards equation (0.21). Operation 1042 supports calculating the RRO voice coil motor assembly corrector value added to the RRO voice coil motor plant corrector value added to the RRO voice coil assembly corrector value denoted by $w_{VCA}val[k]$, and consistent with (0.18).

Figure 13A:
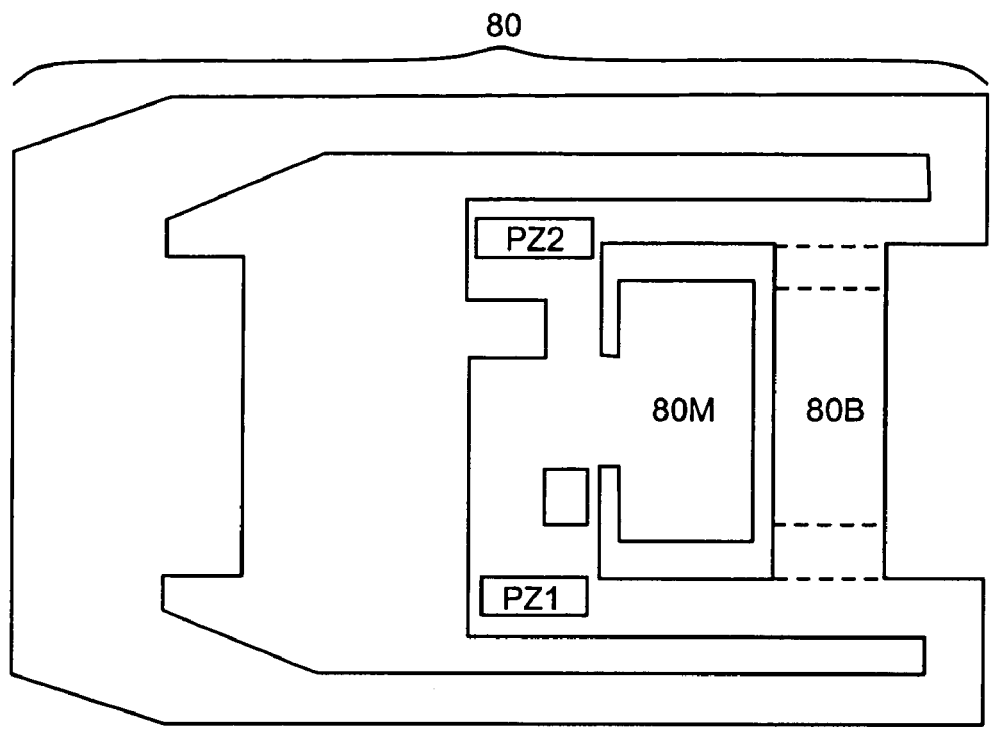
FIG. 13A shows an example of the use of the piezoelectric effect in the micro-actuator assembly of FIG. 8C.
Figure 14A:
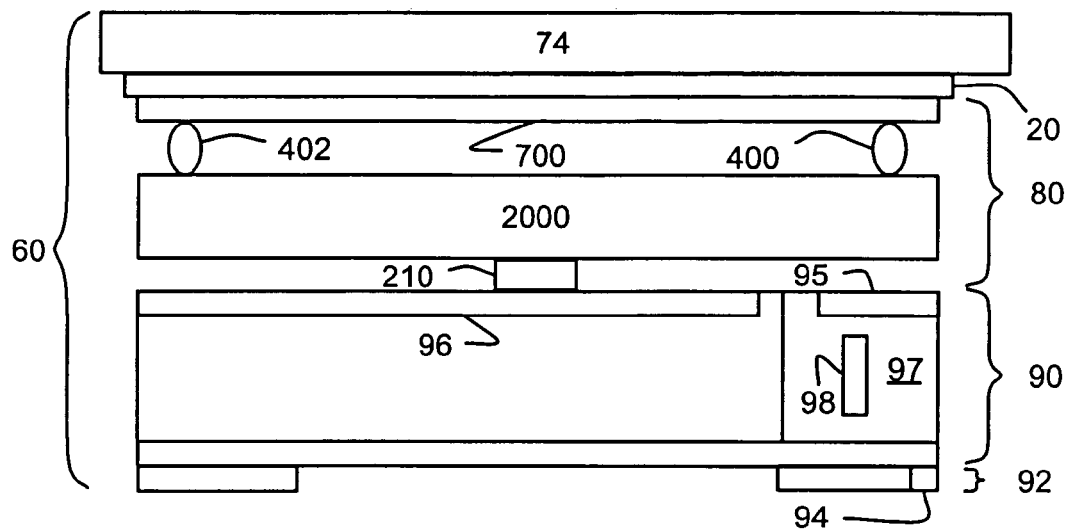
FIGS. 14A and 14B show an example of the use of the electrostatic effect in a micro-actuator assembly for the head gimbal assembly of FIG. 9A.
Figure 14B:
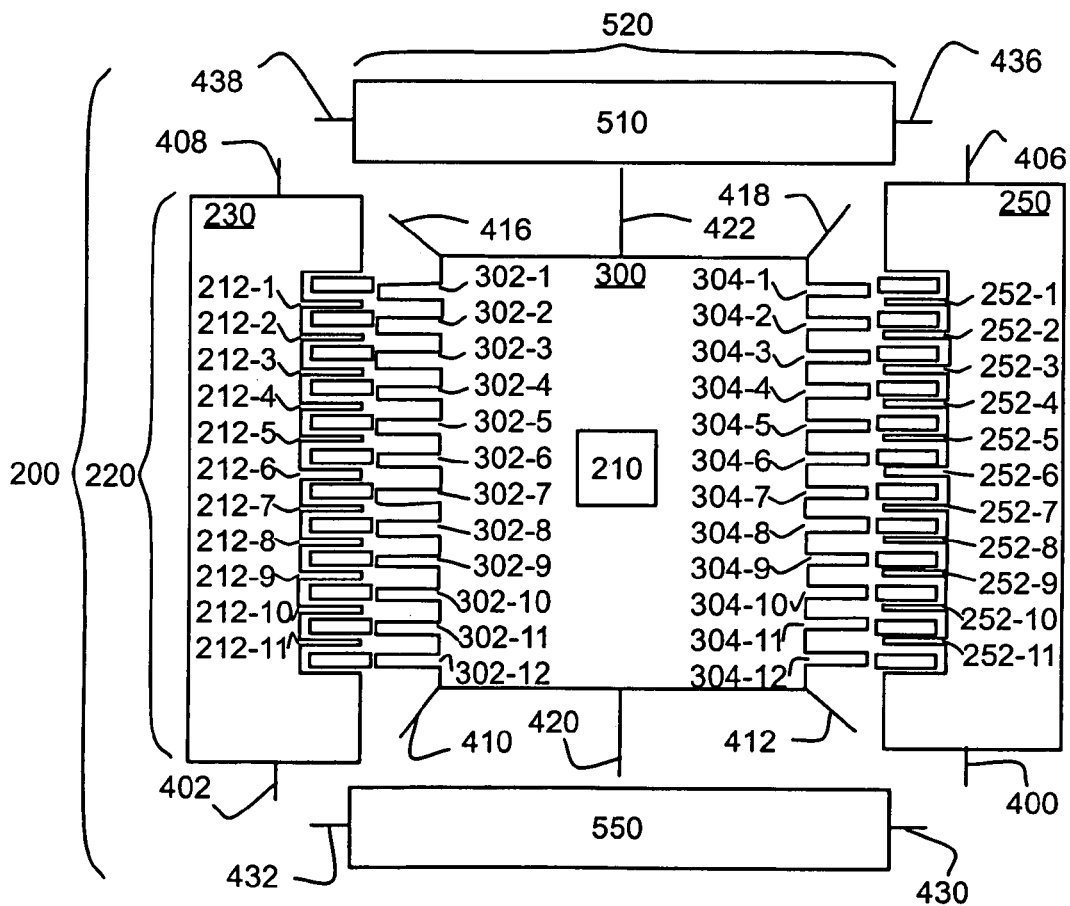
Figure 15:
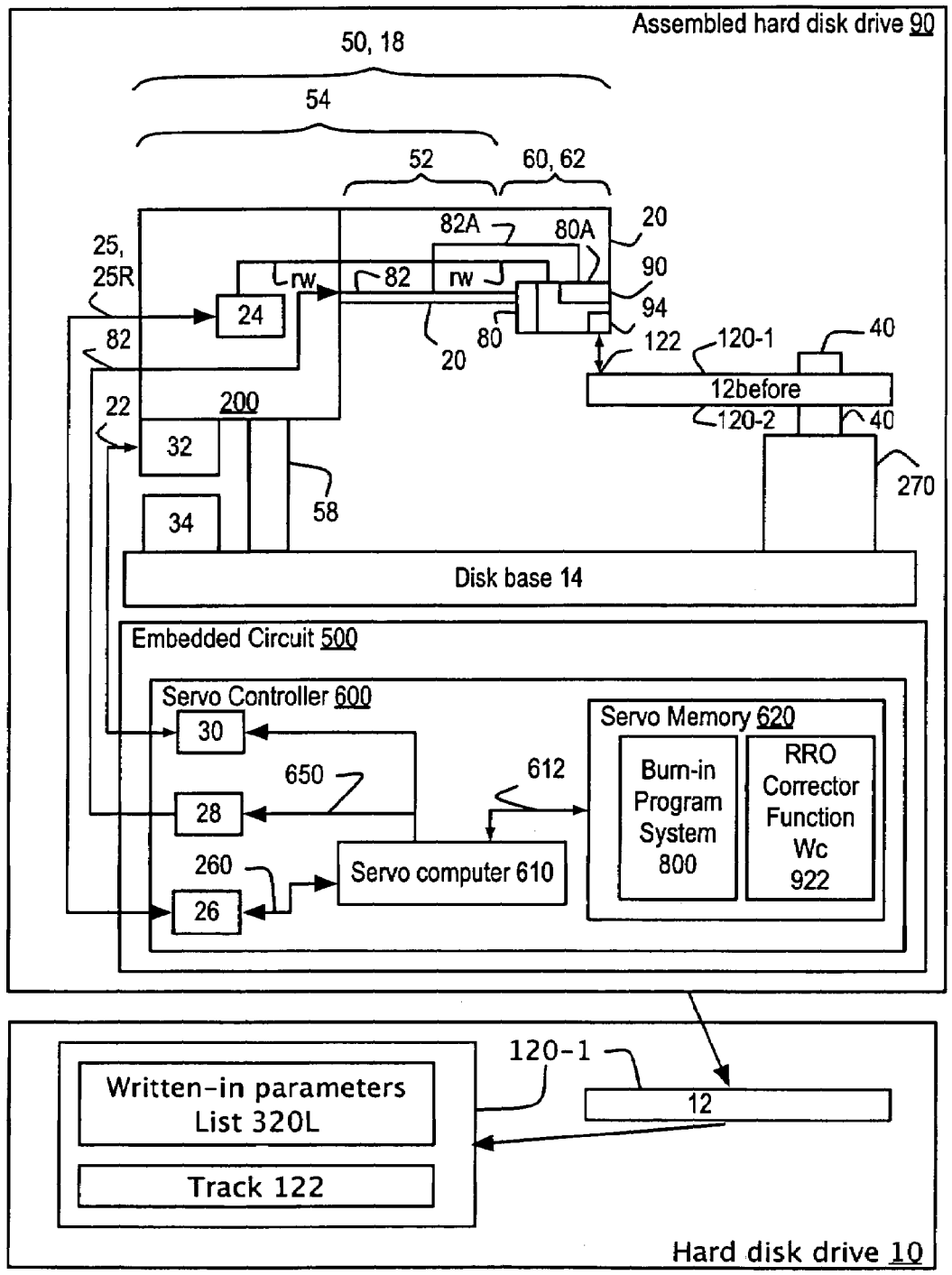
FIG. 15 shows a refinement of the assembled hard disk drive of FIG. 1 including a second micro-actuator for altering the position of the slider.
Figure 19:
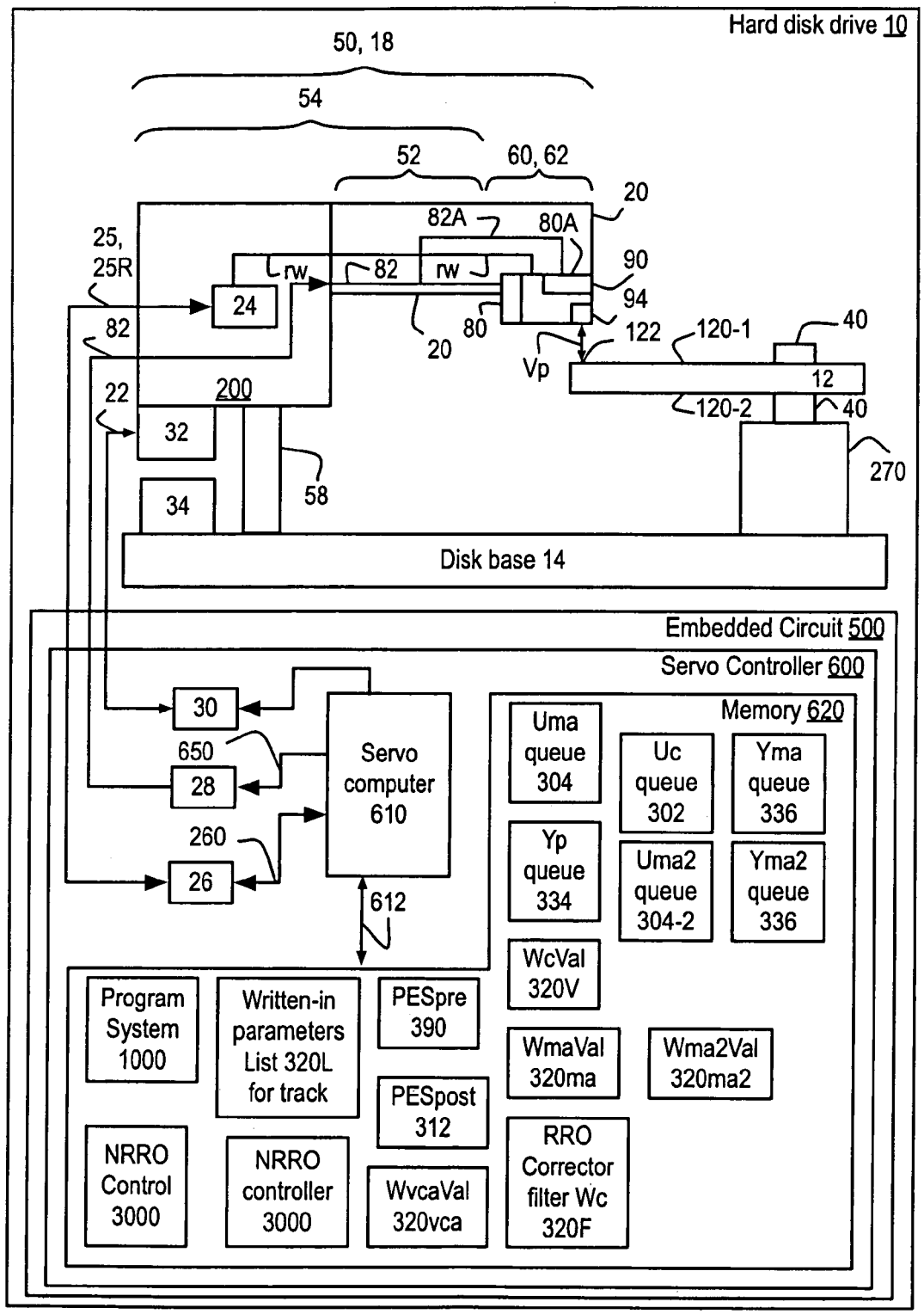

As used herein the term micro-actuator refers to a micro-actuator assembly 80 which couples to the slider 90 to aid in positioning its read-write head 90 near the track 122 on the disk surface 120-1 as shown in FIGS. 1, 6, 8B to 9B, 11, 13A to 15 and 19 or to a micro-actuator 80A embedded in the slider altering the position of its read-write head as shown in FIGS. 15 and 19. An example of a micro-actuator embedded in the slider includes the vertical micro-actuator 98 embedded in the slider to alter the vertical position VP of the read-write head. While this invention is primarily focused on the lateral positioning LP issues, it is readily applicable to vertical position as well.

The hard disk drive 10 may further include a second micro-actuator 80A further contributing to the lateral position LP of the read-write head 90 near the track 122 on the disk surface 120-1 as shown in FIGS. 15 and 19. The parameters of the RRO corrector function Wc 320 for the track on the disk surface, further include: at least one parameter for a second micro-actuator control contribution L. The dynamics and control issues will now be discussed, which will be followed by further discussion of the invention and its embodiments.

In general, these embodiments of the invention will use a second micro-actuator transfer function Pma2

$$P_{MA2} = \frac{L(z)}{M(z)} = \frac{\sum_{k=0}^{N_L} L_k z^{-k}}{1 + \sum_{l=1}^{N_M} M_k z^{-l}} \quad (0.29)$$

Which expresses the second micro-actuator plant output Yma2 340 by $$y_{MA2}[k] = \sum_{l=0}^{N_L} L_l u_{MA}[k-1] - \sum_{l=1}^{N_M} M_l y_{MA}[k-l] \quad (0.30)$$

and requires storage of the written-in parameter list 320L as shown in FIG. 17B of RRO corrector function Wc 320 to include $$W_C = \{F_{k=0}, \ldots, N_F, G_{k=1}, \ldots, N_G, L_{k=1}, \ldots, N_L, M_{k=1}, \ldots, N_M, a_{k=1}, \ldots, N_A, b_{k=0}, \ldots, N_B\} \quad (0.31)$$

Figure 18A:
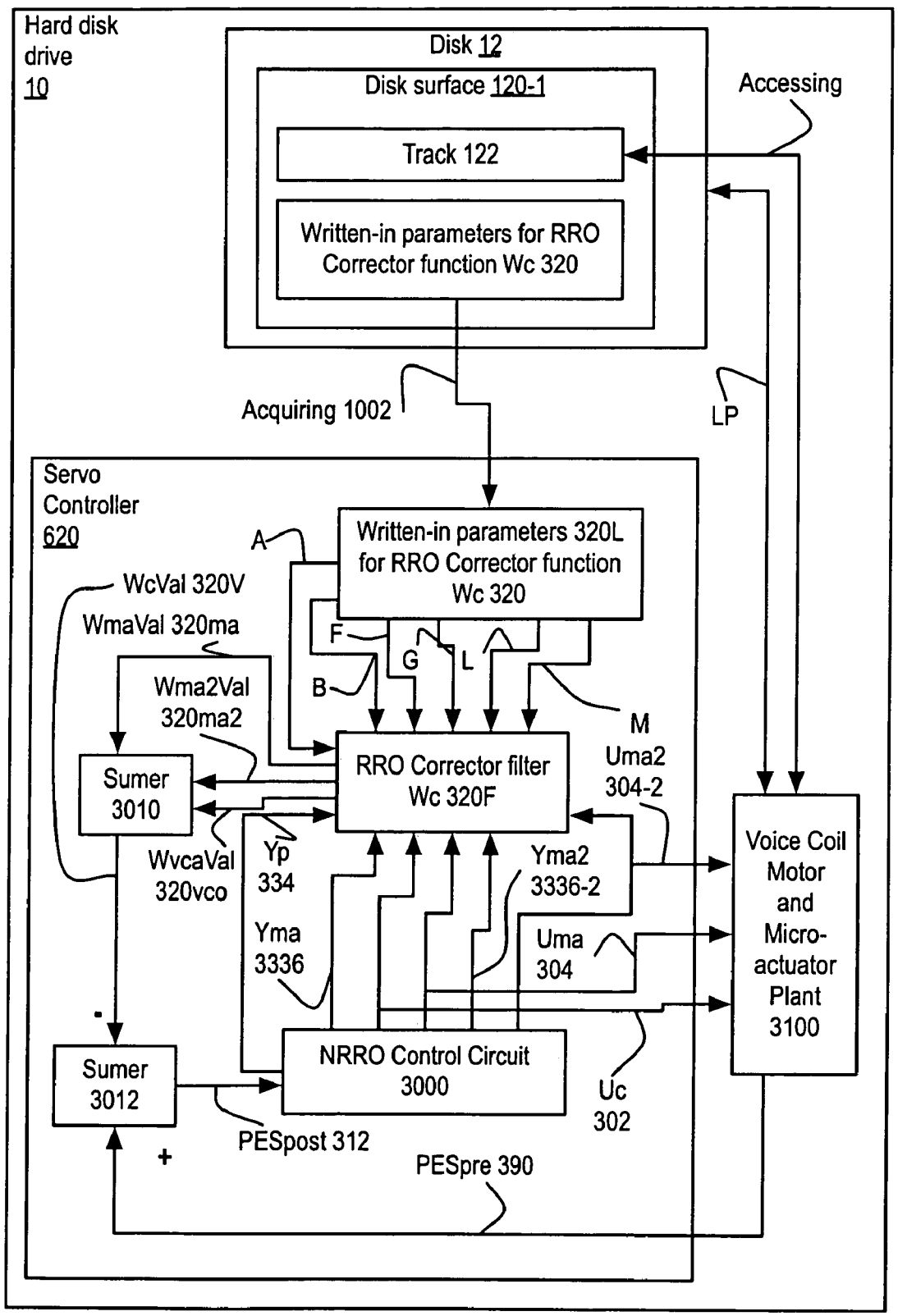
FIGS. 18A to 19 show examples of the hard disk drive resulting from the method of initializing implemented by the burn-in system of FIG. 15.
Figure 18B:
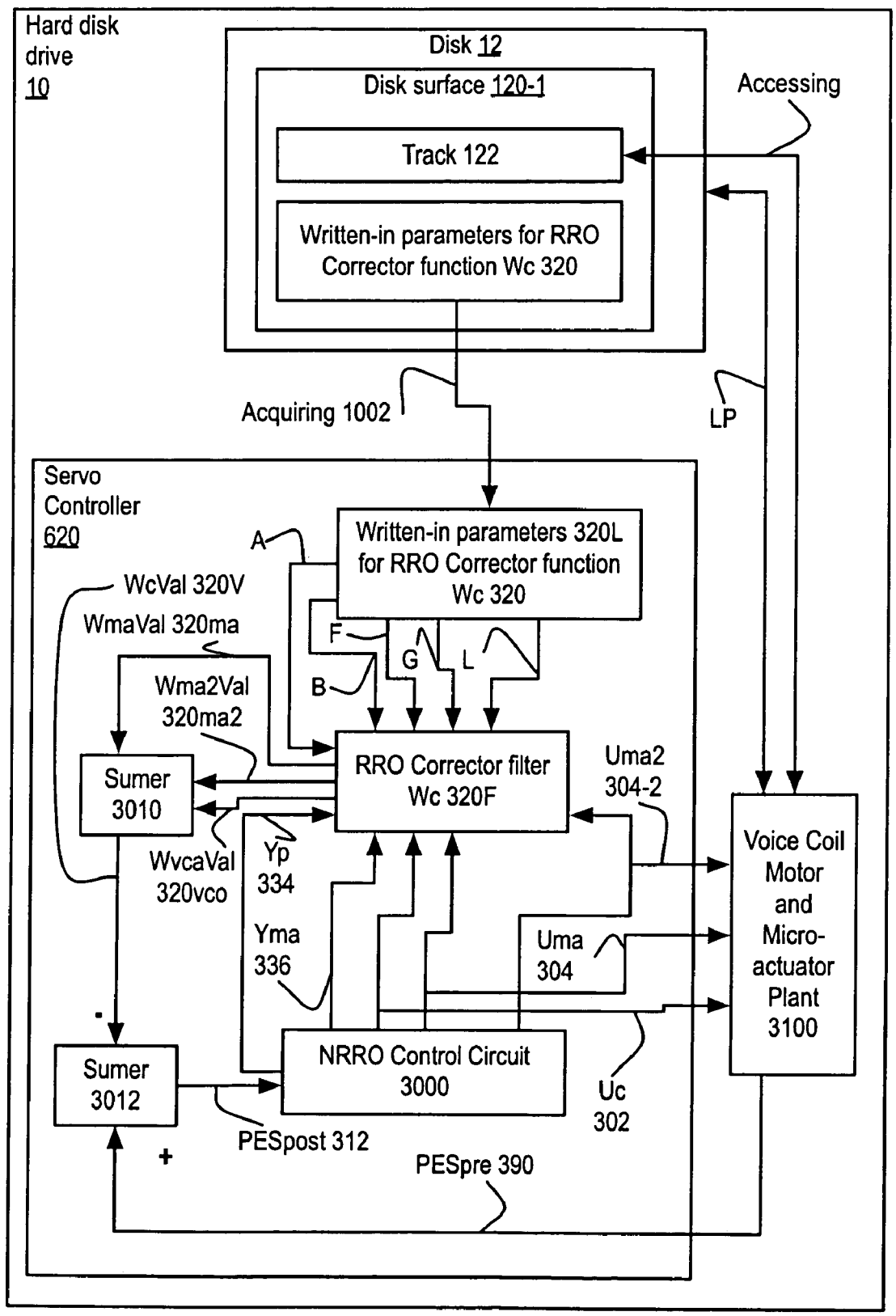

The RRO corrector function Wc 320 may again be implemented as the RRO Corrector filter 320F generating the RRO micro-actuator control corrector value WmaVal 320 ma and the second RRO micro-actuator control corrector value Wma2 Val 320 ma2 which are added to the RRO voice coil assembly corrector value WvcaVal 320 vca to create the RRO corrector value WcVal 320V of FIGS. 18A and 18B. This is mathematically written as $$w_C val[k] \equiv w_{VCA}val[k] + w_{MA}val[k] + w_{MA2}val[k] \quad (0.32)$$

The second RRO micro-actuator control corrector value Wma2 Val 320 ma2 may be preferably defined by $$w_{MA2}val[k] \equiv \sum_{l=0}^{N_L} L_l u_{MA}[k-1] \quad (0.33)$$

which includes the second micro-actuator control contribution $L \equiv [L_0 \ldots L_{N_L}]$ applied to a second micro-actuator control queue Uma2 304-2 denoted by $U_{MA2} \equiv [u_{MA2}[0] \ldots u_{MA2}[N_L]]$ to create the second RRO micro-actuator control corrector value Wma2 Val 320 ma2.

The RRO voice coil assembly corrector value WvcaVal 320 vca when both micro-actuators have significant plant contributions, as shown in FIG. 18A, may be redefined for dual micro-actuators by $$w_{VCA}val[k] \equiv w_{VcmC}val[k] + w_{VcmP}val[k] + w_{MaP}val[k] + w_{Ma2P}val[k] \quad (0.34)$$

showing the RRO voice coil assembly corrector value WvcaVal 320 vca denoted by $w_{VCA}val[k]$ as the RRO voice coil motor control value denoted by $w_{VcmC}val[k]$ added to the RRO voice coil motor plant value denoted by $w_{VcmP}val[k]$, added to the RRO micro-actuator plant corrector value denoted by $w_{MaP}val[k]$, and further added to the second RRO micro-actuator plant corrector value denoted by $w_{Ma2P}val[k]$.

When the second micro-actuator plant contribution is negligible, $N_M=0$, the RRO voice coil assembly corrector value WvcaVal 320 vca may be calculated as indicated in equation (0.18). When the micro-actuator plant contribution is negligible as well, the RRO voice coil assembly corrector value WvcaVal 320 vca may be calculated as indicated in equation (0.28).

When only the micro-actuator plant contribution is negligible, the RRO voice coil assembly corrector value WvcaVal 320 vca may be calculated as $$w_{VCA}val[k] \equiv w_{VcmC}val[k] + w_{VcmP}val[k] + w_{Ma2P}val[k] \quad (0.35)$$

The second RRO micro-actuator plant corrector value denoted by $w_{Ma2P}val[k]$ is defined as the second micro-actuator plant contribution $M \equiv [M_1 \ldots M_{N_M}]$ acting on the second micro-actuator plant queue Yma 336-2 denoted by $Y_{MA2} \equiv [y_{MA2}[k-1] \ldots y_{MA2}[k-N_M]]$ $$w_{Ma2P}val[k] \equiv -\sum_{l=1}^{N_M} M_l y_{MA2}[k-l] \quad (0.36)$$

This single written-in Repeatable Run-Out corrector function Wc 320 has a general advantage of supporting single, dual, and triple stage actuation with the same model, with the transition from triple stage to either dual stage and that dual stage to single stage actuation being handled by setting successive values of $u_{MA}[k]$ and/or $u_{MA2}[k]$ to zero. This hard disk drive 10 supports triple stage actuation when the voice coil motor 18 along with both the micro-actuator 80 and the second micro-actuator 80A are actively controlled.

There are two dual stage actuation modes for the hard disk drive 10. The first turns off the second micro-actuator 80A and the RRO corrector function handles this by setting successive values of $u_{MA2}[k]$ to zero, and the second turns off the micro-actuator 80, which the RRO corrector function handles by setting successive values of $u_{MA}[k]$ to zero.

Single stage actuation involves both the micro-actuator 80 and the second micro-actuator 80A being turned off, which is handled by the RRO corrector function by setting successive values of both $u_{MA}[k]$ and $u_{MA2}[k]$ to zero.

Setting successive values of $u_{MA2}[k]$ to zero preferably means that at the first time step the second micro-actuator control queue Uma2 304-2 has the state $$U_{MA2}=[0u_{MA2}[k-1] \ldots u_{MA2}[k-N_L]] \quad (0.37)$$

and on the second time step, $$U_{MA2}=[0\ 0 \ldots u_{MA2}[k-N_L]] \quad (0.38)$$

and so on, showing the dampening effect, if the higher order terms are significant, of the transition to single stage actuation on the Repeatable Run-Out from the micro-actuator assembly 80. When the higher order terms are treated as zero, as in (0.7), then the transition is modeled as instantaneous, with no residual effects.

FIG. 18B shows a preferred embodiment of the invention, when the second micro-actuator plant contribution is negligible, $N_M=0$, $M(z)=1$ and $$P_{MA2} = \sum_{k=0}^{N_L} L_k z^{-k} \quad (0.39)$$

With the second micro-actuator plant output Yma2 336-2 expressed by $$y_{MA2}[k] = \sum_{l=0}^{N_L} L_l u_{MA}[k-l] \quad (0.40)$$

and requires storage of the written-in parameter list 320L of RRO corrector function Wc 320 to include $$W_C=\{F_{k=0}, \ldots, N_F, G_{k=1}, \ldots, N_G, L_{k=1}, \ldots, N_L, \\ a_{k=1}, \ldots, N_A, b_{k=0}, \ldots, N_B\} \quad (0.41)$$

And when the micro-actuator plant contribution is also negligible, $N_G=0$, $G(z)=1$ and $$P_{MA} = \sum_{k=0}^{N_F} F_k z^{-k} \quad (0.42)$$

With the micro-actuator plant output Yma 336 expressed by $$y_{MA}[k] = \sum_{l=0}^{N_F} F_l u_{MA}[k-l] \quad (0.43)$$

and requires storage of a preferred embodiment of the written-in parameter list 320L as shown in FIG. 17A of RRO corrector function Wc 320 to include $$W_C=\{F_{k=0}, \ldots, N_F, L_{k=1}, \ldots, N_L, a_{k=1}, \ldots, N_A, \\ b_{k=0}, \ldots, N_B\} \quad (0.44)$$

Triple stage actuation support by the RRO corrector function Wc 320 is preferably implemented as the RRO Corrector filter 320F generating the RRO micro-actuator control corrector value WmaVal 320 ma added to the second RRO micro-actuator control corrector value WmaVal 320 ma2 added to the RRO voice coil assembly corrector value WvcaVal 320 vca to create the RRO corrector value WcVal 320V as shown in FIGS. 18A and 18B. This is mathematically written as $$w_C\text{val}[k]=w_{VCA}\text{val}[k]+w_{MA}\text{val}[k]+w_{MA2}\text{val}[k] \quad (0.45)$$

Figure 16A:
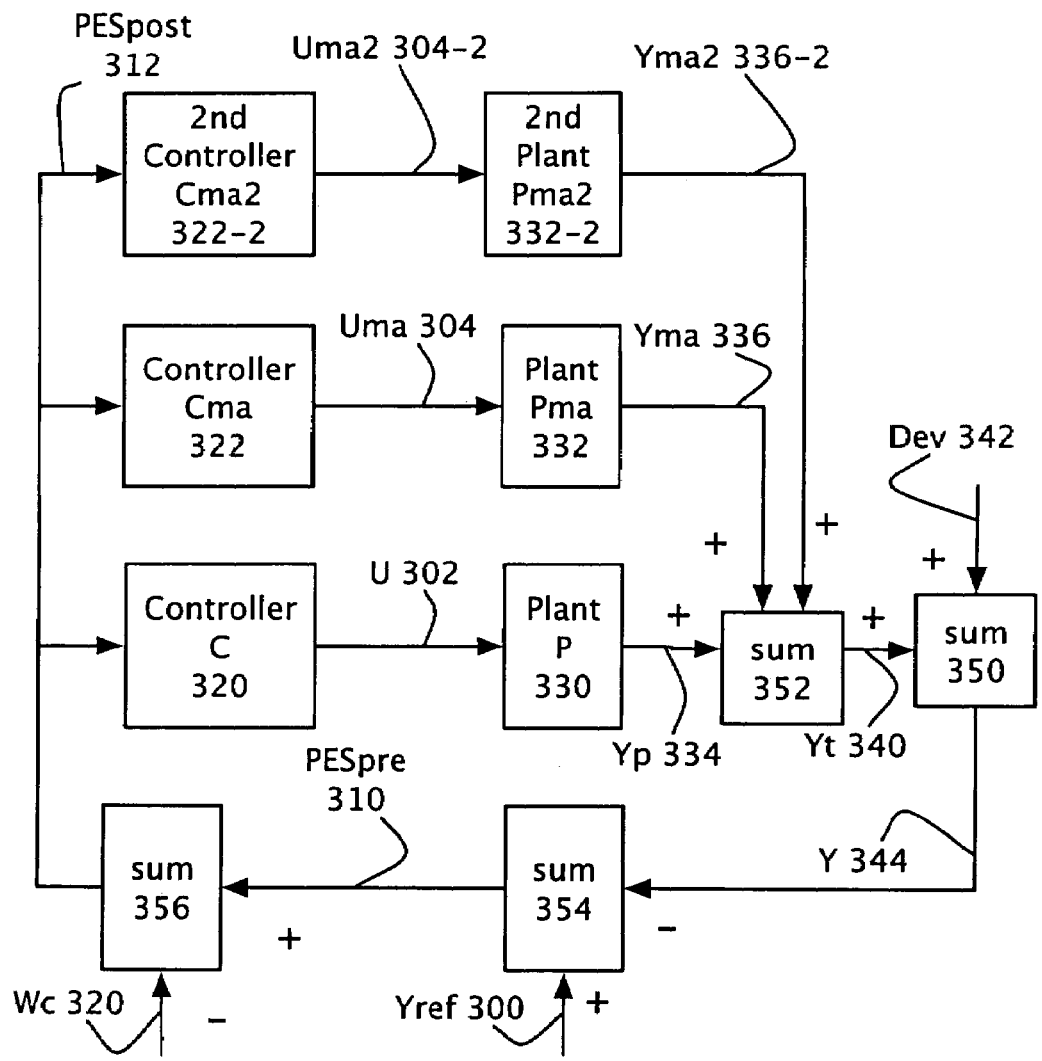
FIG. 16A shows a refinement of the model of FIG. 2B supporting FIG. 15.
Figure 16B:
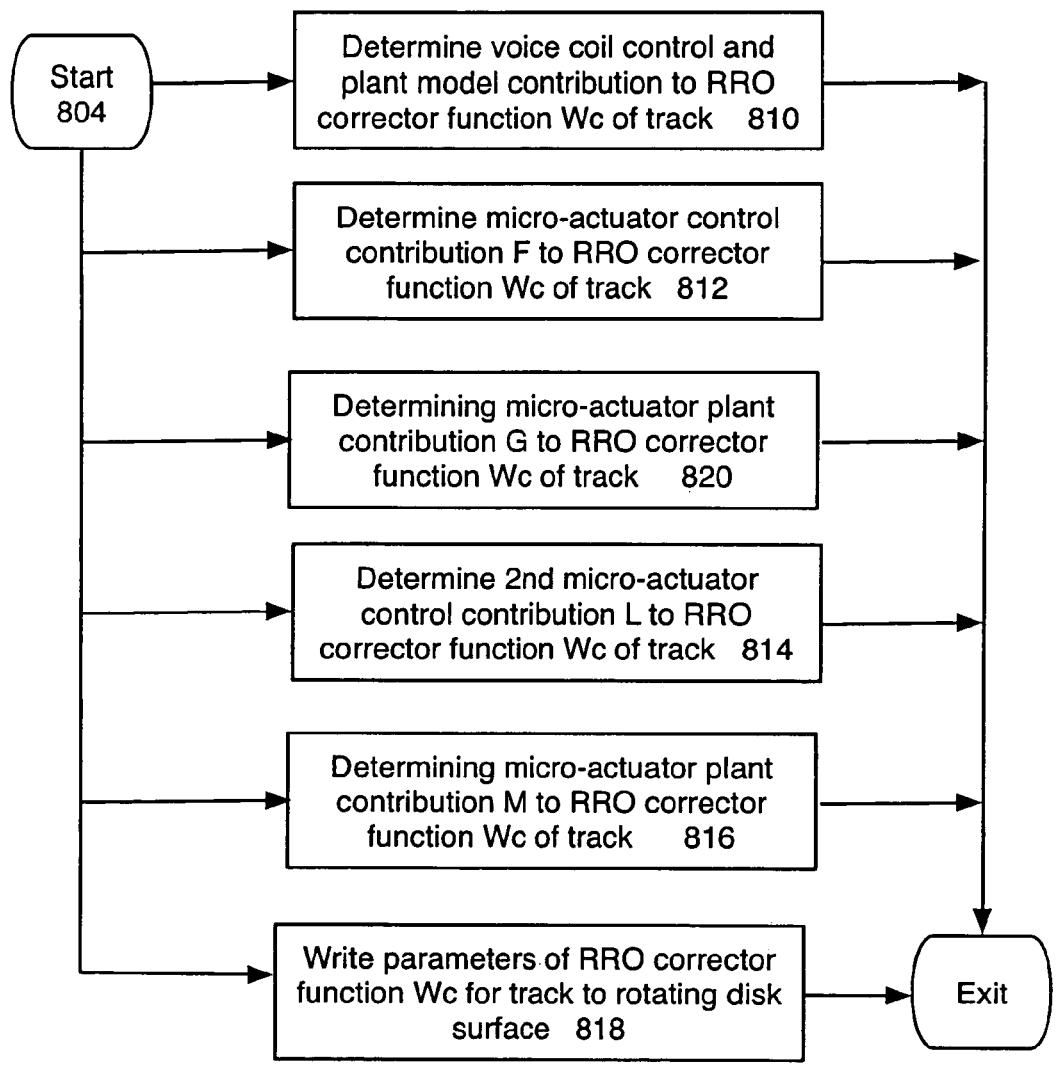
FIG. 16B shows a refinement of FIG. 5B supporting the assembled hard disk drive of FIG. 15.

The method of initializing the assembled hard disk drive 9 of FIG. 15, which is being discussed in terms of the burn-in program system 800, and in particular for operation 804 of FIG. 5A determining and writing parameters of the RRO corrector function Wc 320 of the track 122 on the disk surface 120-1 may preferably include the operations of FIG. 16B. Operation 814 supports determining the second micro-actuator control contribution L to the RRO corrector function. Operation 816 supports determining the second micro-actuator plant contribution M to the RRO corrector function of the track on the disk surface.

In the method of using the written-in RRO corrector parameter list 320L in the hard disk drive 10 of FIGS. 18A to 19, acquiring the written-in RRO corrector parameter list may further include acquiring 1002 the written-in RRO corrector parameter list for the track 122 from the disk surface 120-1 to recreate the second micro-actuator control contribution L for the track.

Figure 20:
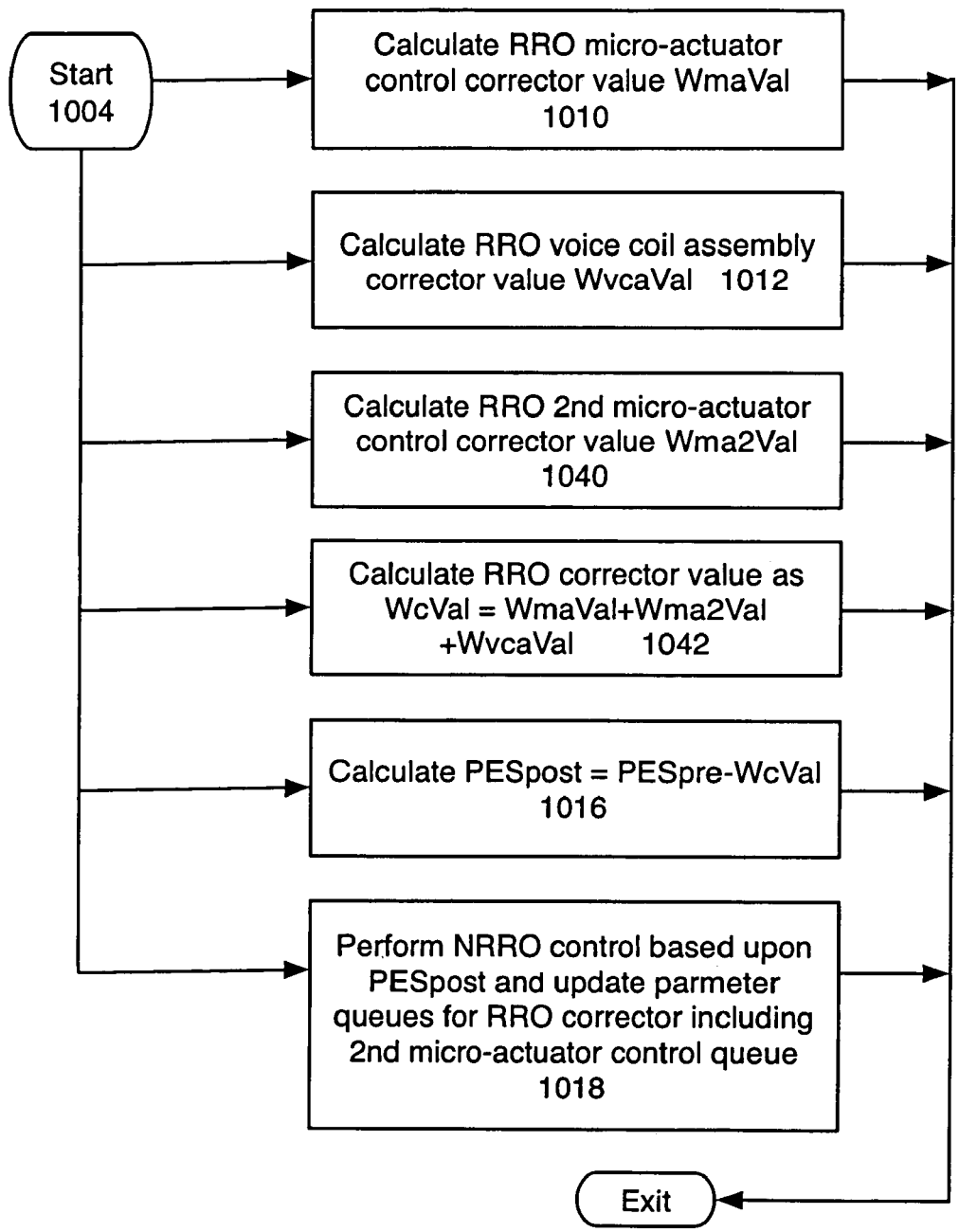
FIGS. 20 to 21B show some details of the servo program system as an implementation of the method of use of the written-in parameter list of FIGS. 15, and 17A to 19.
Figure 21A:
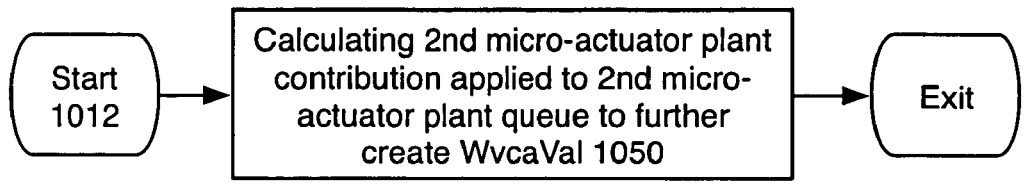
Figure 21B:
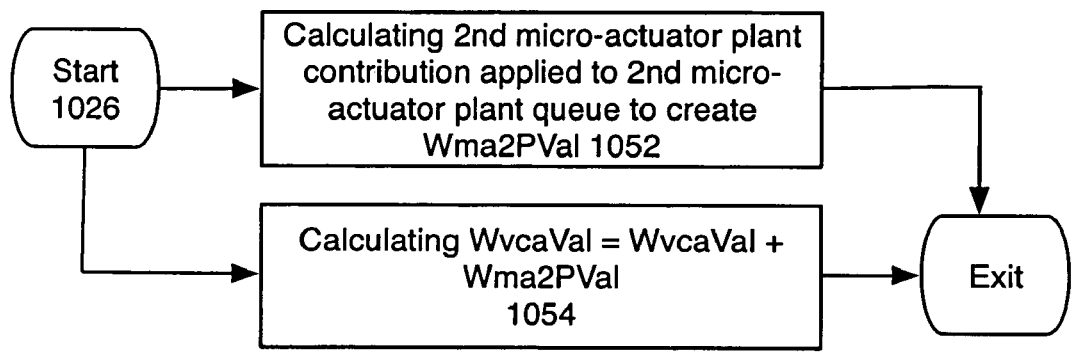

The method of using as implemented by the servo program system 1000, in particular operation 1004 of FIGS. 7A and 7B supporting actuation control using the RRO corrector function Wc 320 for the track 122 may further include the operations of FIG. 20. Operation 1040 supports calculating based upon the second micro-actuator control contribution L applied to a second micro-actuator control queue Uma 304-2 to create the RRO second micro-actuator control corrector value Wma2 Val 320 ma as discussed with equation(0.33).

Operation 1042 supports further calculating the RRO corrector value WcVal 320V as the second RRO micro-actuator control corrector value Wma2 Val 320 am2 added to the RRO micro-actuator control corrector value WmaVal 320 am added to the RRO voice coil assembly corrector value WvcaVal 320 vca as discussed with equation (0.45). Operation 1018 supports performing the NRRO control by further updating the second micro-actuator control queue Uma 304-2.

The slider, and its read-write head may include a read head using a spin valve to read the data on the disk surface, or use a tunneling valve to read the data. The slider may include a vertical micro-actuator for altering the vertical position of the read-write head above the disk surface. The slider may further include the read head providing a read differential signal pair to an amplifier to generate an amplified read signal reported by the slider as a result of the read access of the data on the disk surface. The amplifier may be opposite the air bearing surface, and may be separate from the deformation region, and may further be separate from the vertical micro-actuator.

Figure 8C:
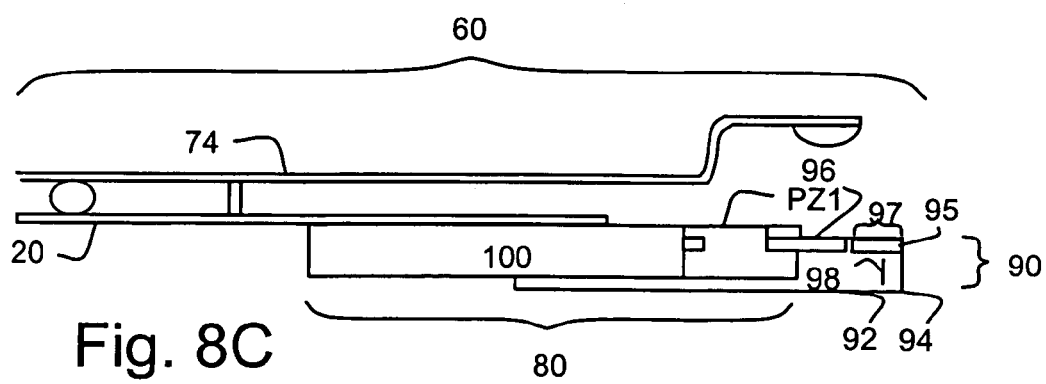
Figure 9A:
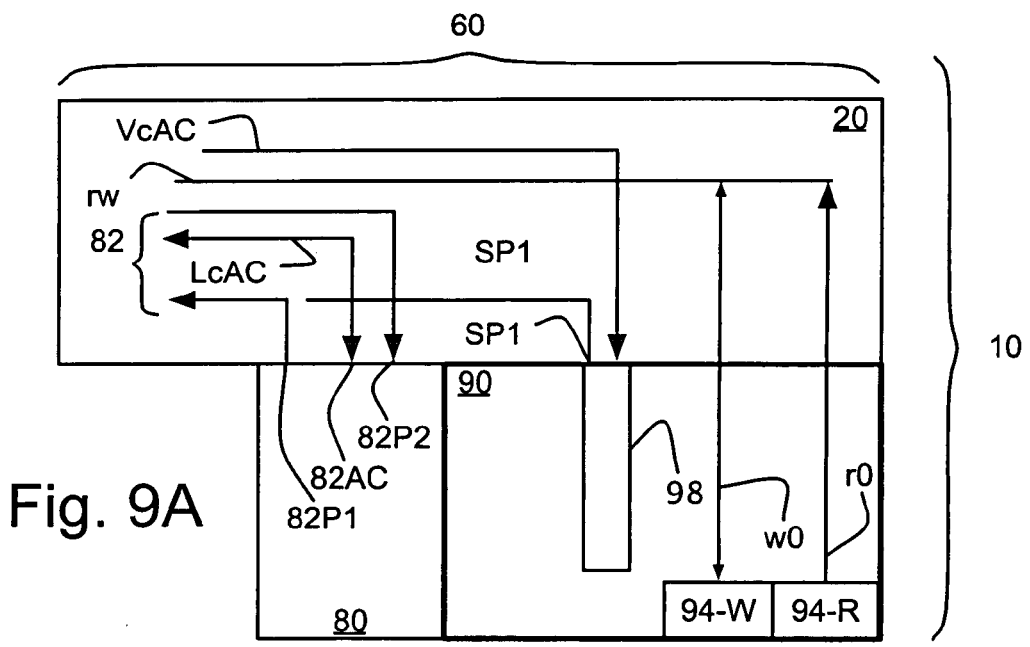

The slider 90 may include a vertical micro-actuator 98, coupled to a deformation region 97 including a read-write head 94 and stimulated by a vertical control signal VcAC providing a potential difference with a first slider power terminal SP1, possibly by heating the deformation region to alter the vertical position Vp of the read-write head over the disk surface 120-1 in a hard disk drive 10 as shown in FIGS. 8C and 9A.

The slider 90 is used to access the data 122 on the disk surface 120-1 in a hard disk drive 10. The data is typically organized in units known as a track 122, which are usually arranged in concentric circles on the disk surface centered about a spindle shaft 40 and alternatively may be organized as joined spiral tracks. Operating the slider to read access the data on the disk surface includes the read head 94-R driving the read differential signal pair r0 to read access the data on the disk surface. The read-write head 94 is formed perpendicular to the air bearing surface 92.

Figure 10A:
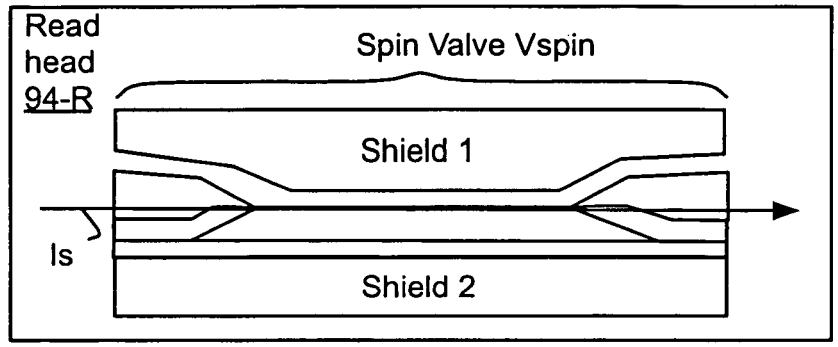
FIG. 10A shows an example of the read head of FIG. 9A employing a spin valve.

The read head 94-R may use a spin valve to drive the read differential signal pair as shown in FIG. 10A. As used herein, the spin valve employs a magneto-resistive effect to create an induced sensing current Is between the first shield Shield1 and the second shield Shield2. Spin valves have been in use the since the mid 1990's.

Figure 10B:
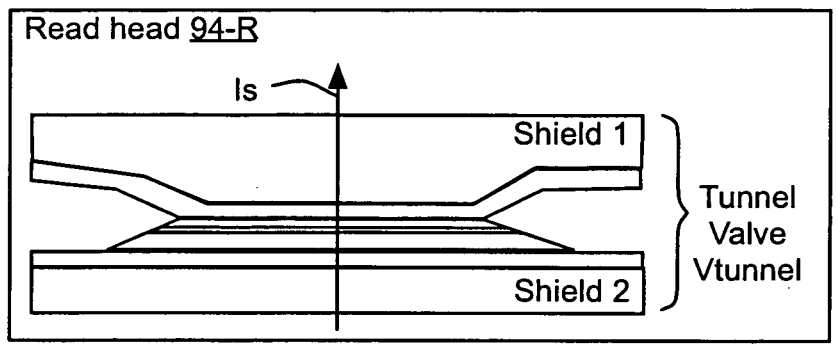
FIG. 10B shows an example of the read head of FIG. 9A employing a tunnel valve.
Figure 10C:
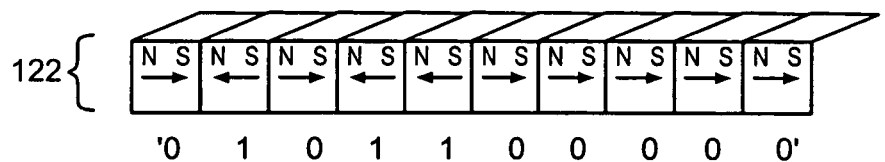
FIG. 10C shows a typical polarization of bits in the track on the disk surface used with the spin valve of FIG. 10A, which is parallel the disk surface.
Figure 10D:
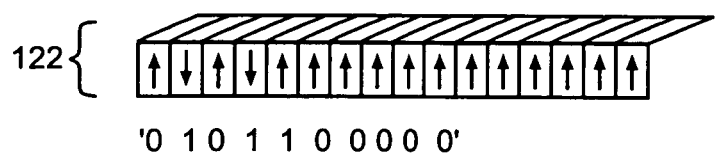
FIG. 10D shows a typical polarization of bits in the track on the disk surface used with the tunneling FIG. 10B, which is perpendicular to the disk surface.

The read head 94-R may use a tunnel valve to drive the read differential signal pair as shown in FIG. 10B. As used herein, a tunnel valve uses a tunneling effect to modulate the sensing current Is perpendicular to the first shield Shield1 and the second shield Shield2. Both longitudinally recorded signals as shown in FIG. 10C and perpendicularly recorded signals shown in FIG. 10D can be read by either reader type. Perpendicular versus longitudinal recording relates to the technology of the writer/media pair, not just reader. This difference in bit polarization lead to the announcement of a large increase in data density, a jump of almost two hundred percent in the spring of 2005.

The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the disk surface 120-1, results in a change of electrical resistance through the tunnel valve.

Figure 13B:
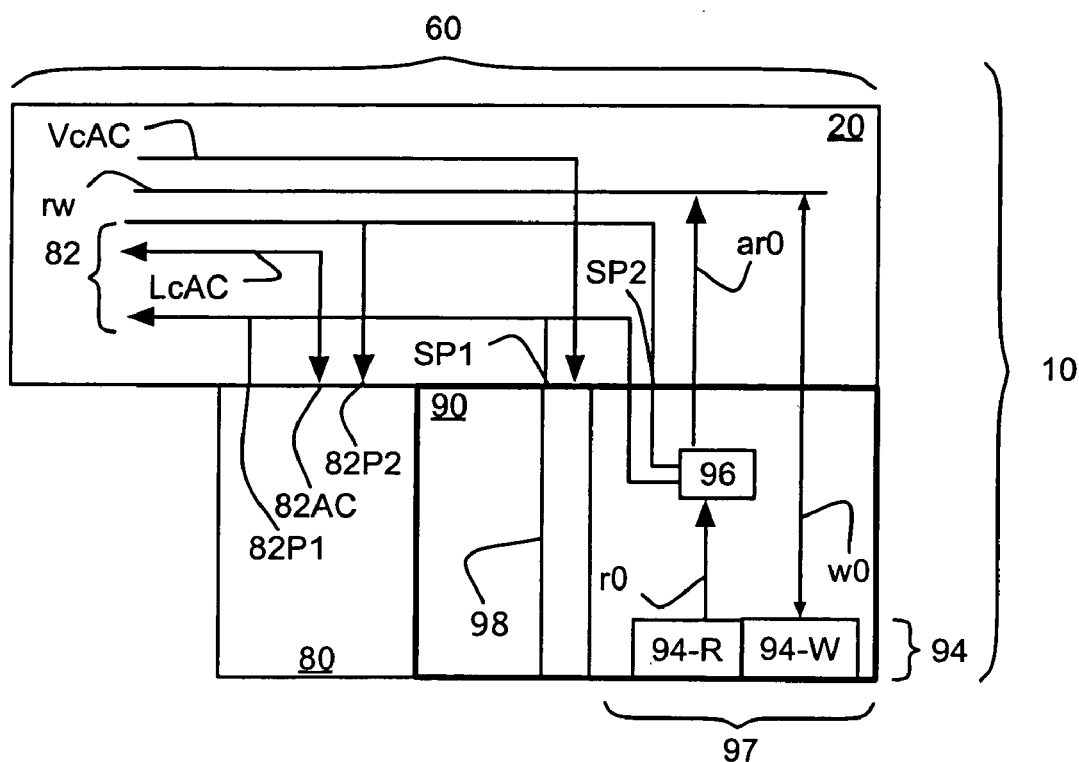
FIG. 13B shows a refinement of the head gimbal assembly, the flexure finger, and the slider of FIG. 9A.

The slider 90 may further include the read-write head 94 providing the read-differential signal pair r0 to the amplifier 96 to generate the amplified read signal ar0, as shown in FIG. 13B. The read-write head preferably includes a read head 94-R driving the read differential signal pair r0 and a write head 94-W receiving a write differential signal pair w0. The slider reports the amplified read signal as a result of read access of the data on the disk surface. In most but not necessarily all of the embodiments of the invention's slider, the amplifier is preferably opposite the air bearing surface 92. The amplified read signal ar0 may be implemented as an amplified read signal pair ar0+- or as a single ended read signal. The vertical micro-actuator 98 may preferably operate by inducing a strain on the deformation region 97 as well as any other materials directly coupled to it, making it preferable for the amplifier to be separated from the vertical micro-actuator and the deformation region, as shown in FIGS. 8C, 13B, and 14A. These embodiments of the invention's slider preferably include a first slider power terminal SP1 and a second slider power terminal SP2 collectively used to power the amplifier in generating the amplified read signal ar0.

The flexure finger may include a micro-actuator assembly for mechanically coupling to an embodiment of the slider. The flexure finger may include a vertical control signal path providing the vertical control signal to the slider and the heating element. The micro-actuator assembly may aid in lateral positioning, and may further aid in vertical positioning of the read-write head over the data of the disk surface. The micro-actuator assembly may employ a piezoelectric effect and/or an electrostatic effect to aid in positioning the read-write head.

The flexure finger 20 for the slider 90 of FIGS. 9A, 6, 11, and 13B, which preferably contains a micro-actuator assembly 80 for mechanically coupling to the slider to aid in positioning the slider to access the data 122 on 120-1 disk surface of the disk 12. The micro-actuator assembly may aid in laterally positioning LP the slider to the disk surface as shown in FIG. 10A and/or aid in vertically positioning VP the slider as shown in FIG. 6. The flexure finger 20 may further provide the vertical control signal VcAC and preferably the first lateral control signal 82P1 as the first slider power terminal SP1 to the vertical micro-actuator.

Figure 11:
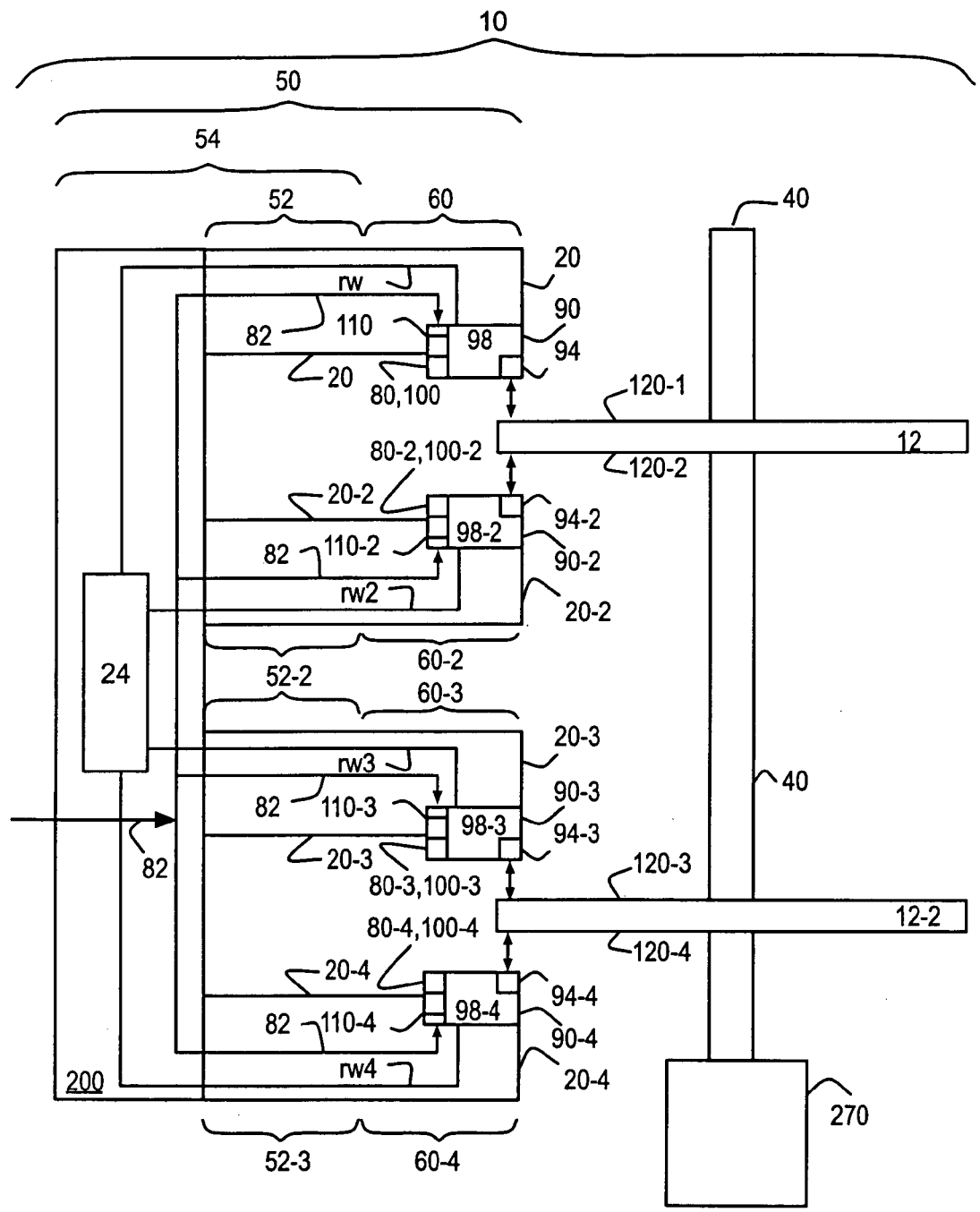
FIGS. 11 and 12 show some details of the hard disk drive and the assembled hard disk drive of the previous Figures.
Figure 12:
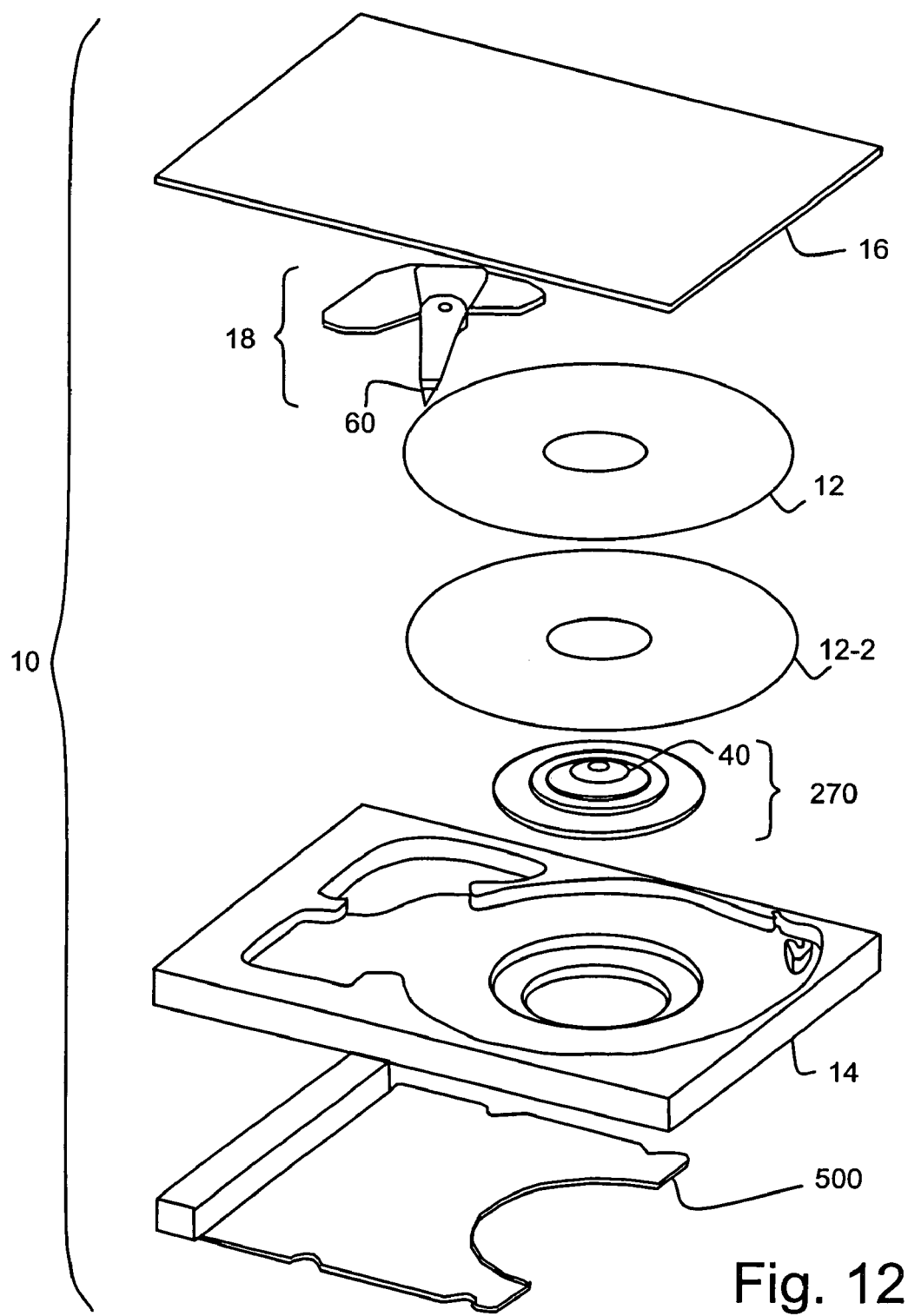

The flexure finger 20 preferably includes the lateral control signal 82 and trace paths between the slider for the write differential signal pair w0. The lateral control signal preferably includes the first lateral control signal 82P1 and the second lateral control signal 82P2, as well as the AC lateral control signal 82AC. When the slider does not contain an amplifier 96, as shown in FIGS. 6, 9A and 11, the flexure finger further preferably provides trace paths for the read differential signal pair r0.

The micro-actuator assembly 80 may employ a piezoelectric effect and/or an electrostatic effect to aid in positioning the slider 90. First, examples of micro-actuator assemblies employing the piezoelectric effect will be discussed followed by electrostatic effect examples. In several embodiments of the invention the micro-actuator assembly may preferably couple with the head gimbal assembly 60 through the flexure finger 20, as shown in FIGS. 9A, 9B, 6 and 13B. The micro-actuator assembly may further couple through the flexure finger to a load beam 74 to the head gimbal assembly and consequently to the voice coil assembly 50.

Examples of micro-actuator assemblies employing the piezoelectric effect are shown in FIGS. 8C and 13A. FIG. 8C shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. The micro-actuator assembly may include the first piezoelectric element and a second piezoelectric element PZ2, both of which may preferably aid in laterally positioning the slider. In certain embodiments, the micro-actuator assembly may be coupled with the slider with a third piezoelectric element PZ3 to aid in the vertically positioning the slider above the disk surface 120-1.

Examples of the invention using micro-actuator assemblies employing the electrostatic effect are shown in FIGS. 14A and 14B derived from the Figures of U.S. patent application Ser. No. 10/986,345, which is incorporated herein by reference. FIG. 14A shows a schematic side view of the micro-actuator assembly 80 coupling to the flexure finger 20 via a micro-actuator mounting plate 700. FIG. 14B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the write differential signal pair W0 and either the read differential signal pair r0 or the amplified read signal ar0 of the read-write head 94 of the slider 90.

The bonding block 210 may electrically couple the read-write head 90 to the amplified read signal ar0 and write differential signal pair W0, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the disk surface 120-1. This lateral motion is a first mechanical degree of freedom, which results from the first stator 230 and the second stator 250 electrostatically interacting with the central movable section 300. The first micro-actuator 220 may act as a lateral comb drive or a transverse comb drive, as is discussed in detail in the incorporated U.S. patent application.

The electrostatic micro-actuator assembly 2000 may further include a second micro-actuator 520 including a third stator 510 and a fourth stator 550. Both the third and the fourth stator electostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated U.S. patent application. The second micro-actuator may also provide motion sensing, which may indicate collision with the disk surface 120-1 being accessed.

The central movable section 300 not only positions the read-write head 10, but may act as the conduit for the write differential signal pair w0 and in certain embodiments, the first slider power signal SP1 and the second slider power signal SP2, as well as the read differential signal pair r0 or the amplified read signal ar0. The electrical stimulus of the first micro-actuator 220 is provided through some of its springs.

The central movable section 300 may preferably to be at ground potential, and so does not need wires. The read differential signal pair r0, the amplified read signal ar0, the write differential signal pair w0 and/or the slider power signals SP1 and SP2 traces may preferably be routed with flexible traces all the way to the load beam 74 as shown in FIG. 14A.

The flexure finger 20 may further provide a read trace path rtp for the amplified read signal ar0, as shown in FIG. 13B. The slider 90 may further include a first slider power terminal SP1 and a second slider power terminal SP2, both electrically coupled to the amplifier 96 to collectively provide power to generate the amplified read signal ar0. The flexure finger may further include a first power path SP1P electrically coupled to the first slider power terminal SP1 and/or a second power path SP2P electrically coupled to the second slider power terminal SP2, which are collectively used to provide electrical power to generate the amplified read signal.

The head gimbal assembly preferably includes the invention's flexure finger coupled to the slider, which further includes the micro-actuator assembly mechanically coupled to the slider and may further include the vertical control signal path electrically coupled to the vertical control signal of the slider. The invention's voice coil assembly includes at least one of the head gimbal assemblies coupled to a head stack. The invention's hard disk drive includes a voice coil assembly, which includes at least one of the head gimbal assemblies.

The head gimbal assembly 60 may include the flexure finger 20 coupled with the slider 90 and a micro-actuator assembly 80 mechanically coupling to the slider to aid in positioning the slider to access the data 122 on the disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the disk surface, which includes providing electrical power to the micro-actuator assembly.

The head gimbal assembly 60 may further provide the vertical control signal VcAC to the heating element of the vertical micro-actuator 98, as shown in FIGS. 6 and 13B. Operating the head gimbal assembly may further preferably include driving the vertical control signal. The first micro-actuator power terminal 82P1 may be tied to the first slider power terminal SP1, and both electrically coupled to the first power path SP1P.

The head gimbal assembly 60 may further include the amplifier 96 to generate the amplified read signal ar0 using the first slider power terminal SP1 and the second slider power terminal SP2. The flexure finger 20 may further contain a read trace path rtp electrically coupled to the amplified read signal ar0, as shown in FIG. 13B. The head gimbal assembly operates as follows when read accessing the data 122, preferably organized as the track 122, on the disk surface 120-1. The slider 90 reports the amplified read signal ar0 as the result of the read access.

Figure 9B:
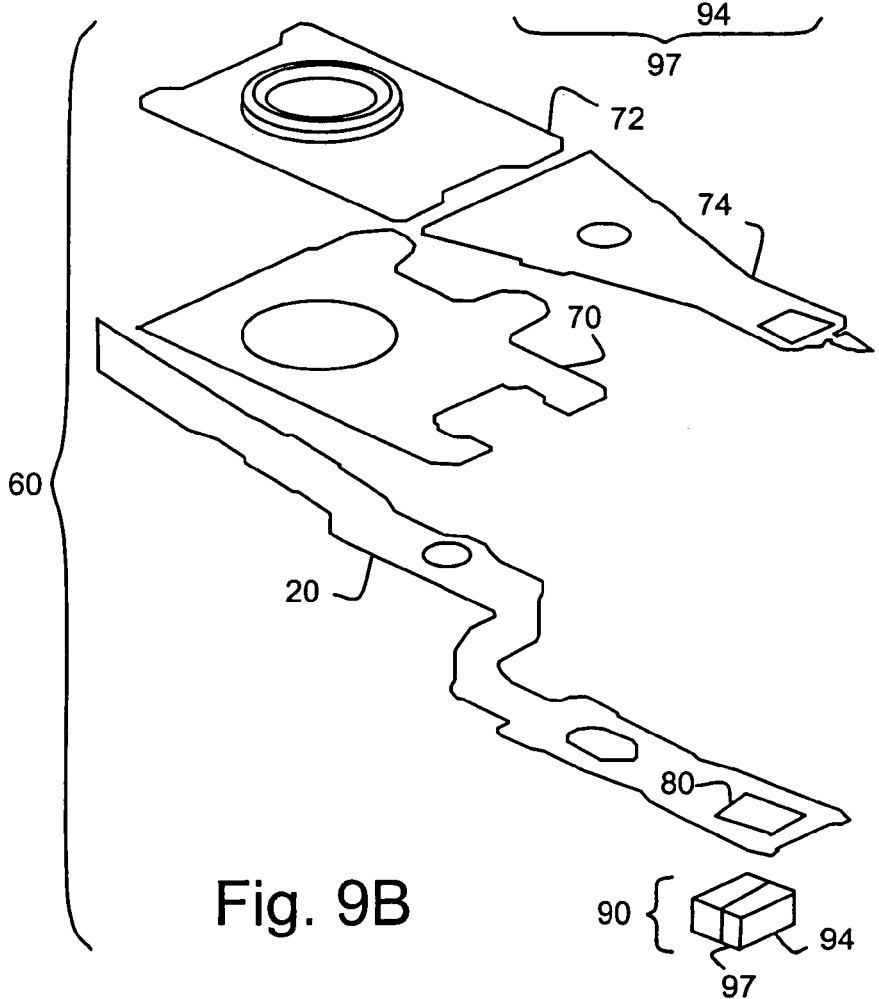

The flexure finger 20 may be coupled to the load beam 74 as shown in FIGS. 9B and 14A, which may further include the first power path SP1P electrically coupled to a metallic portion of the load beam. In certain embodiments, the metallic portion may be essentially all of the load beam.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly. The load beam may preferably electrically couple to the slider to the first slider power terminal SP1, and may further preferably electrically couple to the micro-actuator assembly to form the first power path SP1P.

The invention also includes a voice coil assembly 50 containing at least one head gimbal assembly 60 coupled to a head stack 54, as shown in FIGS. 6 and 11.

The voice coil assembly 50 may include more than one head gimbal assembly 60 coupled to the head stack 54. By way of example, FIG. 11 shows the voice coil assembly coupled with a second head gimbal assembly 60-2, a third head gimbal assembly 60-3 and a fourth head gimbal assembly 60-4. Further, the head stack is shown in FIG. 6 including the actuator arm 52 coupling to the head gimbal assembly. In FIG. 11, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 604. The second head gimbal assembly includes the second slider 90-2, which contains the second read-write head 94-2. The third head gimbal assembly includes the third slider 90-3, which contains the third read-write head

94-3. And the fourth head gimbal assembly includes a fourth slider 90-4, which contains the fourth read-write head 94-4.

The voice coil assembly 50 preferably operates as follows: for each of the sliders 90 included in each of the head gimbal assemblies 60 of the head stack, when the temperature of the shape memory alloy film of the slider is below the first temperature, the film configures in a first solid phase to the deformation region 97 to create the vertical position VP of that read-write head above its disk surface. Whenever the temperature of the film of the shape memory alloy is above the first temperature, the film configures in a second solid phase to the deformation region increasing the vertical position of the read-write head above the disk surface.

In certain embodiments where the slider 90 includes the amplifier 96, the slider reports the amplified read signal ar0 as the result of the read access to the track 122 on the disk surface 120-1. The flexure finger provides the read trace path rtp for the amplified read signal, as shown in FIG. 8C. The voice coil assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal as a result of the read access.

The invention's hard disk drive 10, shown in FIGS. 6, 8A, 9A, 11, 12, 18A, 18B and 19 includes the voice coil assembly 50 pivotably mounted through the actuator pivot 58 on a disk base 14 and arranged for the slider 90 of the head gimbal assembly 60 to be laterally positioned LP near the data 122 for the read-write head 94 to access the data on the disk surface 120-1. The disk 12 is rotatably coupled to the spindle motor 270 by the spindle shaft 40. The voice coil assembly is electrically coupled to the embedded circuit 500.

The embedded circuit 500 may preferably include the servo controller 600, as shown in FIG. 6, which may further include a servo computer 610 accessibly coupled 612 to a memory 620. A servo program system 1000 may direct the servo computer in implementing the method operating the hard disk drive 10. The servo program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC. The lateral control signal may further include one or more second micro-actuator lateral control signals 82A.

The voice coil driver 30 preferably stimulates the voice coil motor 18 through the voice coil 32 to provide coarse position of the slider 90, in particular, the read head 94-R near the track 122 on the disk surface 120-1.

The embedded circuit 500 may further process the read signal 25-R during the read access to the data 122 on the disk surface 120-1. The slider 90 reports the amplified read signal ar0 as the result of a read access of the data 122 on the disk surface 120-1. The flexure finger 20 provides the read trace path rtp for the amplified read signal, as shown in FIG. 8C. The main flex circuit 200 receives the amplified read signal from the read trace path to create the read signal 25-R. The embedded circuit receives the read signal to read the data on the disk surface.

Manufacturing the assembled hard disk drive 9 may include pivotably mounting the voice coil assembly 50 by an actuator pivot 58 to the disk base 14 and arranging the voice coil assembly, the disk 12, and the spindle motor 270 for the slider 90 of the head gimbal assembly 60 to access the data 122 on the disk surface 120-1 of the disk 12 rotatably coupled to the spindle motor, to at least partly create the assembled hard disk drive 9. The invention includes this manufacturing process and the hard disk drive as a product of that process.

Manufacturing the assembled hard disk drive 9 may further include electrically coupling the voice coil assembly 50 to the embedded circuit 500 to provide the read signal 25-R as the result of the read access of the data 122 on the disk surface 120-1. It may further include coupling the servo controller 600 and/or the embedded circuit 500 to the voice coil motor 18 and providing the micro-actuator stimulus signal 650 to drive the micro-actuator assembly 80. And electrically coupling the vertical control driver of the embedded circuit to the vertical control signal VcAC of the slider 90 through the voice coil assembly 50, in particular through the flexure finger 20.

Manufacturing the hard disk drive 10 from the assembled hard disk drive 9 preferably includes loading the burn-in program system 800 into the servo memory 620, as shown in FIGS. 1 and 15, and then executing the burn-in program system, which implements the method of initializing the raw disk 12 before to create the written-in parameter list 320L for the RRO corrector function Wc 320 for the track 122 on the disk surface 120-1. This process is preferably performed for every track to be used for data access, as shown in FIG. 5A. This process may further preferably be performed for each disk surface included the hard disk drive.

Making the servo controller 600 and/or the embedded circuit 500 may include programming the servo memory 620 with the servo program system 1000 to create the servo controller and/or the embedded circuit, preferably programming a non-volatile memory component of the servo memory. Making the embedded circuit, and in some embodiments, the servo controller, may include installing the servo computer 610 and the servo memory into the servo controller and programming the memory with the servo program system to create the servo controller and/or the embedded circuit.

Looking at some of the details of FIG. 11, the hard disk drive 10 includes a disk 12 and a second disk 12-2. The disk includes the disk surface 120-1 and a second disk surface 120-2. The second disk includes a third disk surface 120-3 and a fourth disk surface 120-4. The voice coil motor 18 includes an voice coil assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 944 via a fourth flexure finger 20-4.

During normal disk access operations, the hard disk drive 10 operates as follows when accessing the data 122 on the disk surface 120-1. The spindle motor 270 is directed by the embedded circuit 500, often the servo-controller 600, to rotate the disk 12, rotating the disk surface for access by the read-write head 94. The embedded circuit, in particular, the servo controller drives the voice coil driver 30 to create the voice coil control signal 22, which stimulates the voice coil 32 with an alternating current electrical signal, inducing a time-varying electromagnetic field, which interacts with the fixed magnet 34 to move the voice coil parallel the disk base 14 through the actuator pivot 58, which alters the lateral position LP of the read-write head of the slider 90 in the head gimbal assembly 60 coupled to the actuator arm 52, which is rigidly coupled to the head stack 54 pivoting about the actuator pivot. Typically, the hard disk drive first enters track seek mode, to coarsely position the read-write head near the data, which as stated above, is typically organized as a track. Once the read-write head is close to the track, track following mode is entered. Often this entails additional positioning control provided by the micro-actuator assembly 80 stimulated by the lateral control signal 82, which is driven by the micro-actuator driver 28. In certain embodiments of the hard disk drive supporting triple stage actuation, the second micro-actuator 80A may be further stimulated by one or more, second micro-actuator lateral control signals 82A. Reading the track may also include generating a Position Error Signal 260, which is used by the servo controller as positioning feedback during track following mode. The PES signal may be converted into an internal numeric format to create the PES pre-RRO 310 signal shown in FIGS. 2A, 2B, 3, 4, 6, 15, 16A, 18A, 18B, and 19.

The hard disk drive 10 may operate by driving the vertical control signal VcAC to stimulate the vertical micro-actuator 98 to increase the vertical position VP of the slider 90 by providing a potential difference to the first slider terminal SP1. This operation may be performed when seeking a track 122 of data on the disk surface 120-1, and/or when following the track on the disk surface. The servo controller 600 may include means for driving the vertical control signal, which may be at least partly implemented by the vertical control driver 29 creating the vertical control signal to be provided to the vertical micro-actuator. The vertical control driver is typically an analog circuit with a vertical position digital input 290 driven by the servo computer 610 to create the vertical control signal.

Track following and track seeking may be implemented as means for track seeking and means for track following, one or both of which may be implemented at least in part as program steps in the program system 1000 residing in the memory 620 accessibly coupled 612 to the servo computer 610 shown in FIG. 6. Alternatively, the means for track seeking and/or the means for track following may be implemented as at least one finite state machine.

The methods of this invention may be implemented as means for performing the operations of each method. By way of example, the method of using the written-in parameter list 320L is shown implemented within the hard disk drive 10 in FIGS. 3, 4, 18A and 18B in a manner to illustrate the means for implementing the steps of the method.

Means for acquiring 1002 said written-in RRO corrector parameter list 320L for said track 122 from said disk surface 122-1 to recreate said voice coil motor control contribution B, said voice coil motor plant contribution A, and said micro-actuator control contribution F is shown in FIGS. 3, 4, 18A and 18B. The means for acquiring further recreates the micro-actuator plant contribution G in FIGS. 3, 18A and 18B. The means for acquiring further recreates the second micro-actuator control contribution L in FIGS. 18A and 18B. The means for acquiring further recreates the second micro-actuator plant contribution M in FIG. 18A.

The means for controlling actuation is shown in FIGS. 3, 4, 18A and 18B as the interaction of the servo controller 600 with the voice coil motor and micro-actuator plant 3100, which includes the following. Means for calculating the RRO corrector filter Wc 320F based upon said micro-actuator control contribution F applied to a micro-actuator control queue Uma 304, said voice coil motor control contribution A applied to a voice coil motor control queue Uc 302, and said voice coil motor plant contribution B applied to a voice coil motor plant queue Yp 334, to create the RRO micro-actuator control corrector value WmaVal 320 ma, and the RRO voice coil assembly corrector value WvcaVal 320 vca. Means for calculating 3010 the RRO corrector value WcVal as said RRO micro-actuator control corrector value added to said RRO voice coil assembly corrector value. Means for calculating 3012 the Position Error Signal (PES) post-RRO 312 as the PES pre-RRO 310 minus the RRO corrector value. And means for performing 3000 the Non-Repeatable Run-Out (NRRO) control based upon the PES post RRO and updating said micro-actuator control queue, said voice coil motor control queue, and said voice coil motor plant queue.

Any and/or all of the means of the methods of this invention may at least one instance of at least one of a computer, an inferential engine, at least one finite state machine and/or a neural network. The discussion herein has focused on a computer implementation to aid in presenting the invention. This is not meant limit the scope of the Claims, but rather clarify the operations of the invention's method of initializing the raw disk 12before in the assembled hard disk drive 9 as well as the invention's method of using the written-in parameter list 320L for the Repeatable Run-Out corrector function Wc 320 in the hard disk drive 10.

The preceding embodiments provide examples of the invention and are not meant to constrain the scope of the following claims.

What is claimed is:

1. A method of initializing a disk surface included in a disk in an assembled hard disk drive, comprising the steps:
    determining a voice coil motor control contribution and a voice coil motor plant contribution to a Repeatable Run-Out (RRO) corrector function of a track on said disk surface;
    determining a micro-actuator control contribution to said RRO corrector function of said track on said disk surface; and
    writing the parameters of said RRO corrector function for said track to said disk surface to create a written-in RRO corrector function parameter list on said disk surface included in a hard disk drive;
    wherein said parameters of said RRO corrector function, include:
    at least one parameter for said voice coil motor control contribution;
    at least one parameter for said voice coil motor plant contribution; and
    at least one parameter for said micro-actuator control contribution;

wherein said hard disk drive includes a voice coil motor and a micro-actuator contributing to at least the lateral position of a read-write head to said track on said disk surface.

2. The method of claim 1, further comprising the step:
determining a micro-actuator plant contribution to said RRO corrector function of said track on said disk surface.

3. The method of claim 2, wherein said parameters of said RRO corrector function, further include:
at least one parameter for said micro-actuator plant contribution.

4. The method of claim 1, for each of said tracks for use in data access on said disk surface, further comprising:
determining said voice coil motor control contribution and said voice coil motor plant contribution to said RRO corrector function of said track;
determining said micro-actuator control contribution to said RRO corrector function of said track; and
writing the parameters of said RRO corrector function for said track to said disk surface.

5. The method of claim 4, wherein said disk includes a second disk surface; and
wherein said method further comprises, for each track for use in data access on said second disk surface, further comprises the steps:
determining said voice coil motor control contribution and said voice coil motor plant contribution to said RRO corrector function of said track on said second disk surface;
determining said micro-actuator control contribution to said RRO corrector function of said track on said second disk surface; and
writing the parameters of said RRO corrector function for said track to said second disk surface.

6. An embedded circuit included in the assembled hard disk drive implementing the method of claim 1, comprising:
a servo computer accessibly coupled to a servo memory and directed by a burn-in program system, comprising program steps residing in said servo memory;
wherein said burn-in program system, comprises the program steps:
determining said voice coil motor control contribution and said voice coil motor plant contribution to said RRO corrector function of said track on said disk surface;
determining said micro-actuator control contribution to said RRO corrector function of said track on said disk surface; and
writing the parameters of said RRO corrector function for said track to said disk surface.

7. The hard disk drive including said disk surface containing said written-in RRO corrector parameter list, as a product of the process of claim 1.

8. A method of using said written-in RRO corrector parameter list in said hard disk drive of claim 7, comprising the steps:
acquiring said written-in RRO corrector parameter list for said track from said disk surface to recreate said voice coil motor control contribution, said voice coil motor plant contribution, and said micro-actuator control contribution, each for said track used for data access on said disk surface;
controlling actuation of said hard disk drive using said RRO corrector function for said track, based upon said voice coil motor control contribution, said voice coil motor plant contribution, and said micro-actuator control contribution, further comprising the steps:
calculating the RRO corrector filter based upon
said micro-actuator control contribution applied to a micro-actuator control queue,
said voice coil motor control contribution applied to a voice coil motor control queue, and
said voice coil motor plant contribution applied to a voice coil motor plant queue,
to create the RRO micro-actuator control corrector value, and the RRO voice coil assembly corrector value;
calculating the RRO corrector value as said RRO micro-actuator control corrector value added to said RRO voice coil assembly corrector value;
calculating the Position Error Signal (PES) post-RRO as the PES pre-RRO minus said RRO corrector value;
performing Non-Repeatable Run-Out (NRRO) control based upon said PES post-RRO and updating said micro-actuator control queue, said voice coil motor control queue, and said voice coil motor plant queue;
wherein said hard disk drives operates in a single stage actuation mode when said micro-actuator control queue is updated with zero and otherwise operates in a dual stage actuation mode.

9. The method of claim 8, wherein the step calculating said RRO corrector filter, further comprises the steps:
calculating said micro-actuator control contribution applied to a micro-actuator control queue to create the RRO micro-actuator control corrector value;
calculating said voice coil motor control contribution applied to a voice coil motor control queue to create the RRO voice coil motor control corrector value;
calculating said voice coil motor plant contribution applied to a voice coil motor plant queue to create the RRO voice coil motor plant corrector value; and
calculating the RRO voice coil assembly corrector value as said RRO voice coil motor control corrector value added to said RRO voice coil motor plant corrector value.

10. The method of claim 8, further comprising at least one member of the group consisting of the steps:
following said track in said single stage actuation mode; and
following said track in said dual stage actuation mode.

11. The method of claim 10, wherein the step following said track in said single stage actuation mode, further comprises the step:
following said track in said single stage actuation mode, when the micro-actuator is damaged.

12. The method of claim 8, wherein said parameters of said RRO corrector function, further include: at least one parameter for a micro-actuator plant contribution; and
wherein the step calculating said RRO corrector filter, further comprises the step:
calculating the RRO corrector filter based upon
said micro-actuator plant contribution applied to a micro-actuator plant queue,
said micro-actuator control contribution applied to a micro-actuator control queue,
said voice coil motor control contribution applied to a voice coil motor control queue, and
said voice coil motor plant contribution applied to a voice coil motor plant queue,
to create the RRO micro-actuator control corrector value, and the RRO voice coil assembly corrector value;

wherein the step performing NRRO control, further comprises the step:
updating said micro-actuator plant queue.

13. The method of claim 12, wherein the step calculating said RRO filter, further comprises the steps:
calculating said micro-actuator plant contribution applied to a micro-actuator plant queue to create the RRO micro-actuator plant corrector value;
calculating said micro-actuator control contribution applied to a micro-actuator control queue to create the RRO micro-actuator control corrector value;
calculating said voice coil motor control contribution applied to a voice coil motor control queue to create the RRO voice coil motor control corrector value;
calculating said voice coil motor plant contribution applied to a voice coil motor plant queue to create the RRO voice coil motor plant corrector value; and
calculating the RRO voice coil assembly corrector value as said RRO voice coil motor control corrector value added to said RRO voice coil motor plant corrector value added to said RRO micro-actuator plant corrector value.

14. The method of claim 8, wherein said hard disk drive includes a second micro-actuator further contributing to the lateral position of said read-write head to said track on said disk surface;
wherein said parameters of said RRO corrector function for said track on said disk surface, further include: at least one parameter for a second micro-actuator control contribution;
wherein the step acquiring said written-in RRO corrector parameter list, further comprises the step:
acquiring said written-in RRO corrector parameter list for said track from said disk surface to recreate said second micro-actuator control contribution for said track;
wherein the step calculating said RRO corrector filter, further comprises the step:
calculating said RRO corrector filter based upon
said second micro-actuator control contribution applied to a micro-actuator control queue,
said micro-actuator control contribution applied to a micro-actuator control queue,
said voice coil motor control contribution applied to a voice coil motor control queue, and
said voice coil motor plant contribution applied to a voice coil motor plant queue,
to create the RRO second micro-actuator control corrector value, said RRO micro-actuator control corrector value, and said RRO voice coil assembly corrector value;
wherein the step calculating said RRO corrector value, further comprises the step:
calculating said RRO corrector value as said RRO second micro-actuator control corrector value added to said RRO micro-actuator control corrector value added to said RRO: voice coil assembly corrector value;
wherein the step performing NRRO control, further comprises the step:
updating said second micro-actuator control queue;
wherein said hard disk drive operates in said single stage actuation mode when said micro-actuator control queue is updated with zero and said second micro-actuator control queue is updated with zero;
wherein said hard disk drive operates in said dual stage actuation mode when one of said micro-actuator control queue and said second micro-actuator control queue is updated with zero; and wherein said hard disk drive operates in said triple stage actuation mode when both of said micro-actuator control queue and said second micro-actuator control queue are updated with non-zero.

15. The method of claim 14,
wherein the step calculating said RRO corrector filter, further comprises the step:
calculating based upon said second micro-actuator control contribution applied to said second micro-actuator control queue to create said RRO second micro-actuator control corrector value.

16. The hard disk drive implementing the method of claim 8, comprising:
a servo controller driving a micro-actuator to laterally position a slider near said track on said disk surface to update said micro-actuator control queue;
said servo controller driving said voice coil motor to laterally position said slider close to said track on said disk surface to update said voice coil motor control queue and said voice coil motor plant queue.

17. The hard disk drive of claim 16, wherein said servo controller, further comprises:
a servo computer accessibly coupled to a servo memory and directed by a servo program system, including program steps residing in said servo memory;
wherein said servo program system, comprises the program steps:
acquiring said written-in RRO corrector parameter list for said track from said disk surface to recreate said voice coil motor control contribution, said voice coil motor plant contribution, and said micro-actuator control contribution, each for said track used for data access on said disk surface; and
controlling actuation of said hard disk drive using said RRO corrector function for said track, based upon said voice coil motor control contribution, said voice coil motor plant contribution, and said micro-actuator control contribution.

18. The hard disk drive of claim 16, wherein said servo controller further comprises:
means for calculating the RRO corrector filter based upon
said micro-actuator control contribution applied to said micro-actuator control queue,
said voice coil motor control contribution applied to said voice coil motor control queue, and
said voice coil motor plant contribution applied to said voice coil motor plant queue,
to create said RRO micro-actuator control corrector value, and said RRO voice coil assembly corrector value;
means for calculating said RRO corrector value as said RRO micro-actuator control corrector value added to said RRO voice coil assembly corrector value;
means for calculating said Position Error Signal (PES) post-RRO as said PES pre-RRO minus said RRO corrector value; and
means for performing Non-Repeatable Run-Out (NRRO) control based upon said PES post RRO and updating said micro-actuator control queue, said voice coil motor control queue, and said voice coil motor plant queue.

19. The hard disk drive of claim 18, wherein at least one of said means includes at least one instance of at least one member of the group consisting of a computer, a finite state machine, an inferential engine, and a neural network.

20. The method of claim 1,
wherein said hard disk drive includes a second micro-actuator further contributing to the lateral position of said read-write head to said track on said disk surface;
wherein said method, further comprises the step:
determining a second micro-actuator control contribution to said RRO corrector function of said track on said disk surface; and
wherein said parameters of said RRO corrector function for said track on said disk surface, further include: at least one parameter for said second micro-actuator control contribution.

21. The method of claim 20, further comprising the step:
determining a second micro-actuator plant contribution to said RRO corrector function of said track on said disk surface.

22. The method of claim 21, wherein said parameters of said RRO corrector function, further include:
at least one parameter for said second micro-actuator plant contribution.

* * * * *